US008112379B2

(12) United States Patent
Voskuil et al.

(10) Patent No.: US 8,112,379 B2
(45) Date of Patent: Feb. 7, 2012

(54) POLICY PROCESSOR FOR CONFIGURATION MANAGEMENT

(75) Inventors: Eric Voskuil, Kirkland, WA (US); Derek Menzies, Redmond, WA (US); Leonard Charest, Redmond, WA (US); Rahul Gupta, Bothell, WA (US); Phillip Mienk, Redmond, WA (US); Jeremiah S. Nay, Sammamish, WA (US); Dilip Radhakrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/407,062

(22) Filed: Mar. 19, 2009

(65) Prior Publication Data

US 2010/0241603 A1    Sep. 23, 2010

(51) Int. Cl.
  *G06F 1/00* (2006.01)
(52) U.S. Cl. .................... 706/47; 434/118; 717/104
(58) Field of Classification Search ............ 706/47
  See application file for complete search history.

(56) References Cited

U.S. PATENT DOCUMENTS

| 7,152,157 | B2 | 12/2006 | Murphy et al. |
| 7,464,147 | B1 | 12/2008 | Fakhouri et al. |
| 2005/0154576 | A1 | 7/2005 | Tarui et al. |
| 2005/0256961 | A1 | 11/2005 | Alon et al. |
| 2007/0027972 | A1 | 2/2007 | Agrawal et al. |
| 2007/0150936 | A1 | 6/2007 | Maes |
| 2007/0180490 | A1 | 8/2007 | Renzi et al. |
| 2008/0229277 | A1 | 9/2008 | Devarakonda et al. |
| 2010/0227301 | A1* | 9/2010 | Yu et al. .................. 434/118 |

OTHER PUBLICATIONS

"Self Configuration of Networks", retrieved at <<http://bcr2.uwaterloo.ca/~rboutaba/self_configuration_of_networks.htm>>, Jan. 27, 2009, pp. 2.

Agrawal, et al., "Policy-Based Validation of SAN Configuration", retrieved at <<http://www.research.ibm.com/people/k/kangwon/publications/policy2004.pdf, pp. 1-10.

* cited by examiner

*Primary Examiner* — Omar Fernandez Rivas
*Assistant Examiner* — Kalpana Bharadwaj

(57) ABSTRACT

A policy processor is described that may be used to implement a system for managing the configuration of assets in a distributed computing network, such as an enterprise network. The policy processor resides on a managed node in the distributed computing network and operates to receive, evaluate and enact policies issued by one or more policy authorities in the distributed computing network. The policy processor utilizes a conflict resolution model to determine which policy rules included within the policies should be put into effect and which should not.

19 Claims, 23 Drawing Sheets

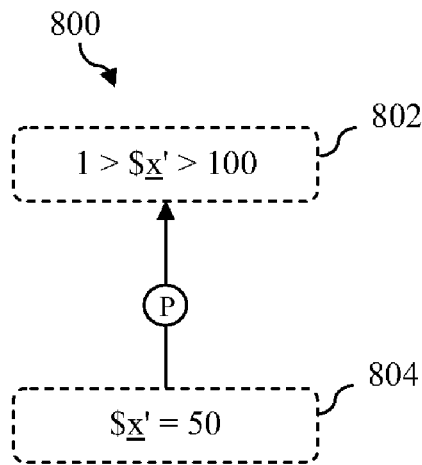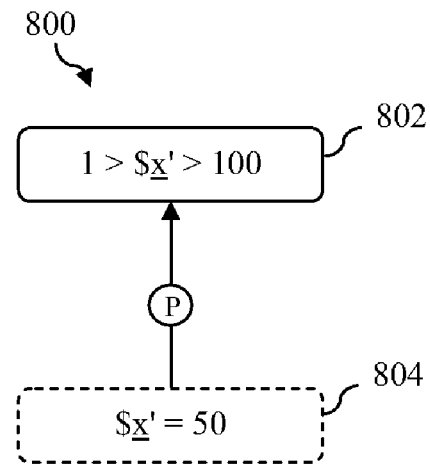
FIG. 8A  FIG. 8B
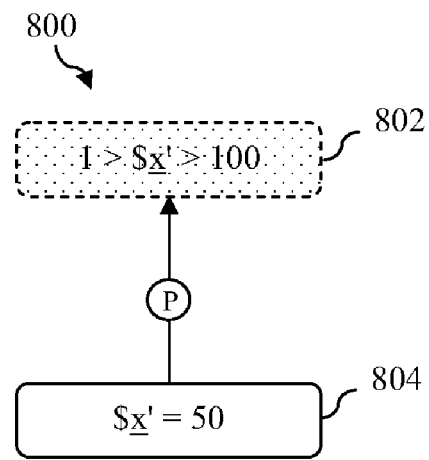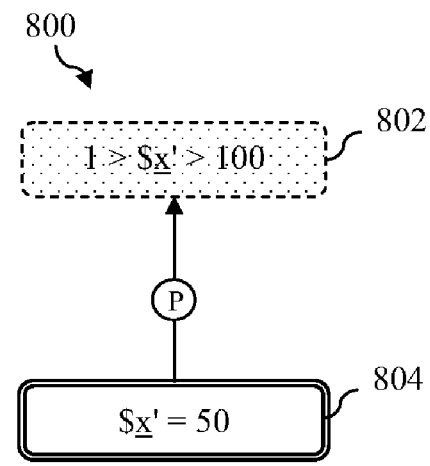
FIG. 8C  FIG. 8D

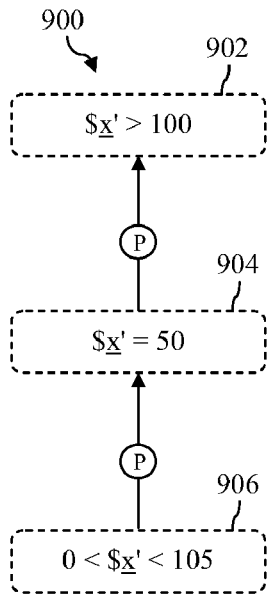 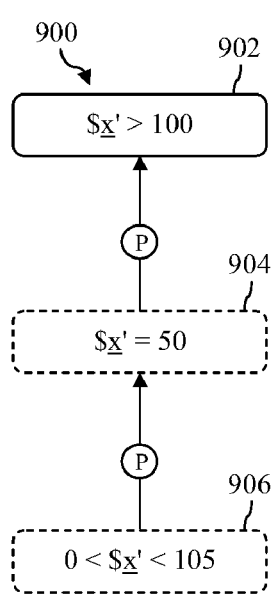 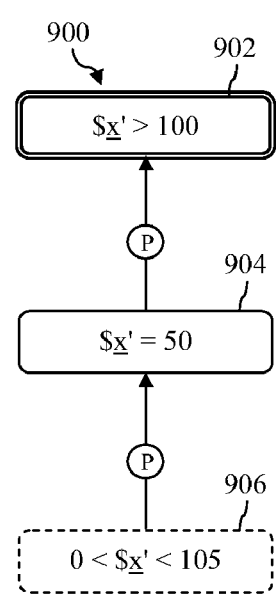
FIG. 9A  FIG. 9B  FIG. 9C
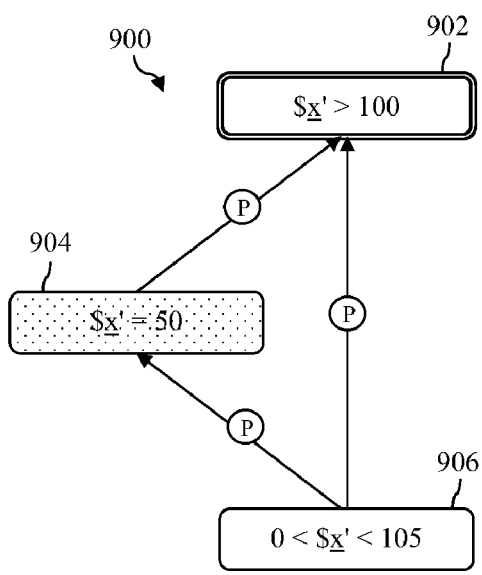 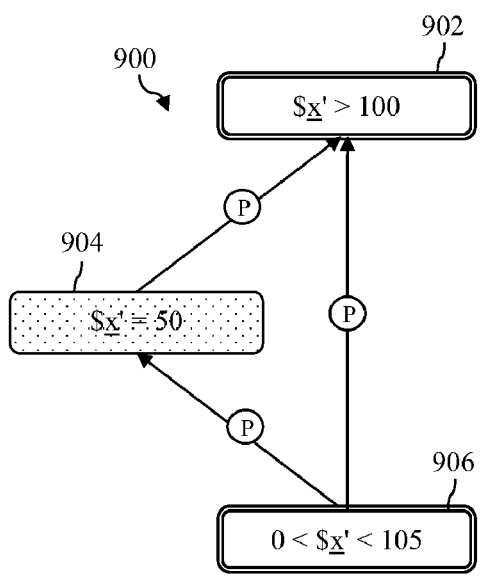
FIG. 9D  FIG. 9E

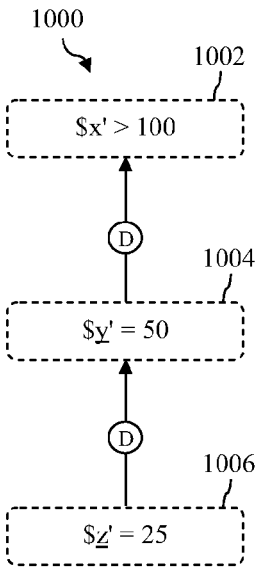 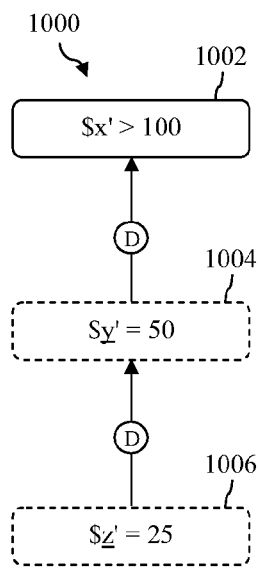 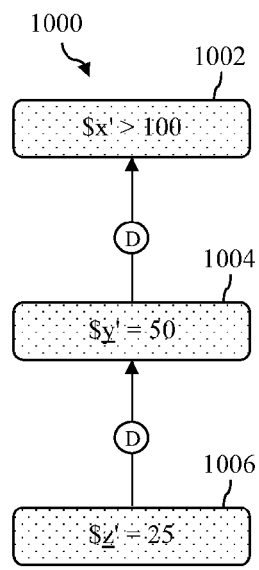
FIG. 10A      FIG. 10B      FIG. 10C
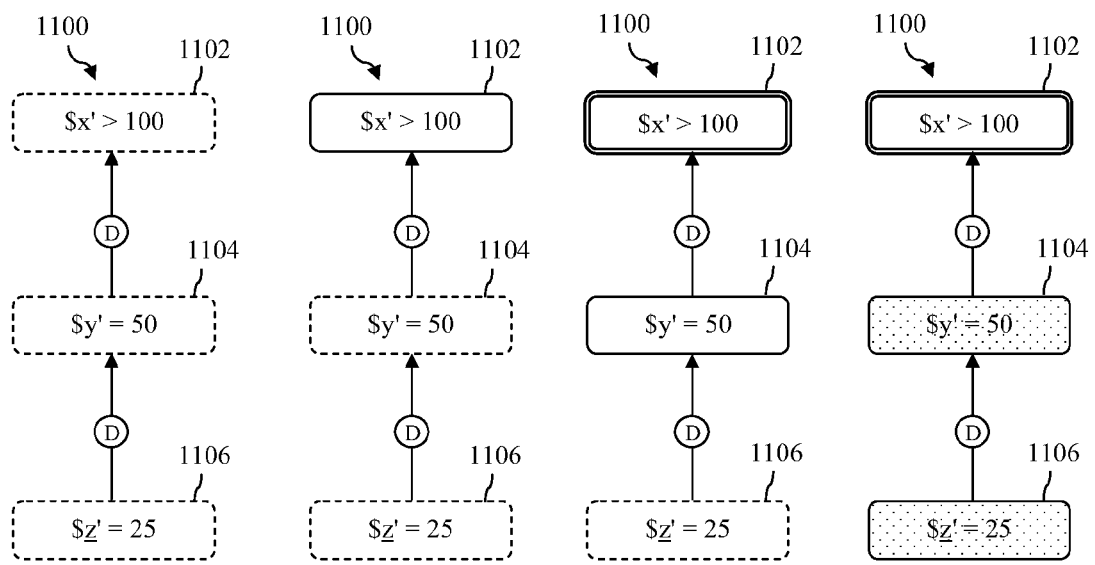
FIG. 11A      FIG. 11B      FIG. 11C      FIG. 11D

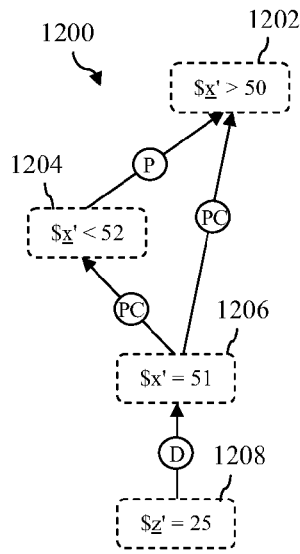 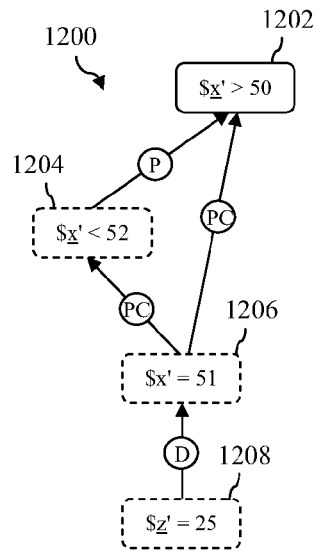 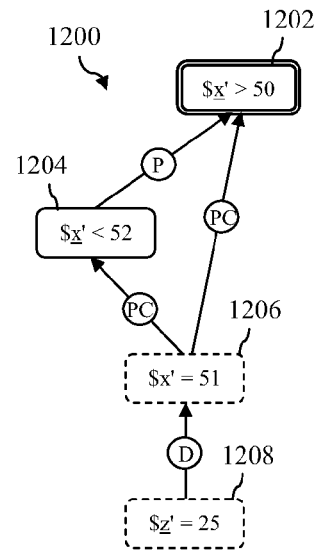
FIG. 12A  FIG. 12B  FIG. 12C
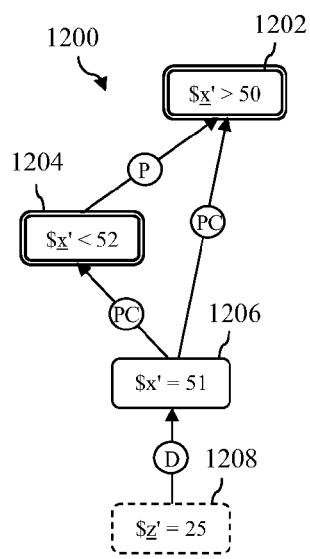 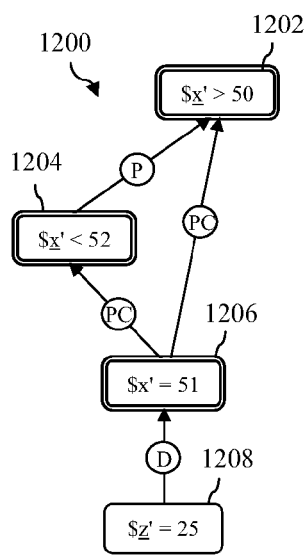 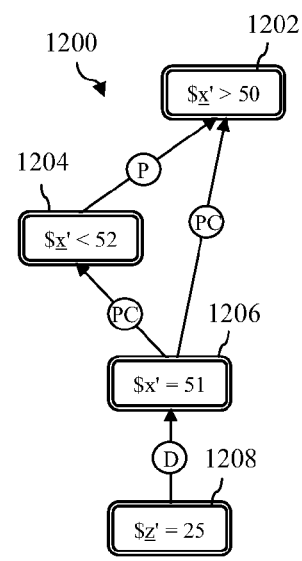
FIG. 12D  FIG. 12E  FIG. 12F

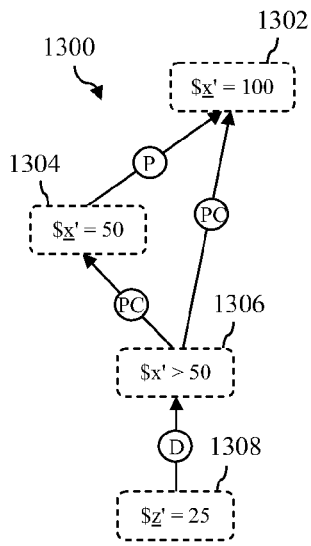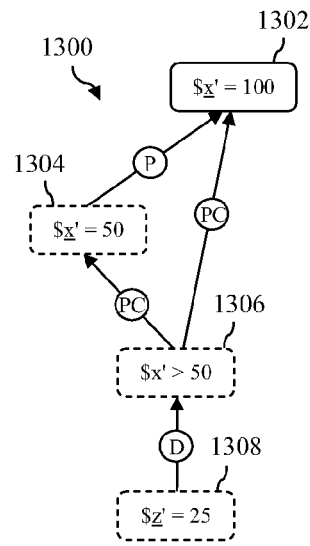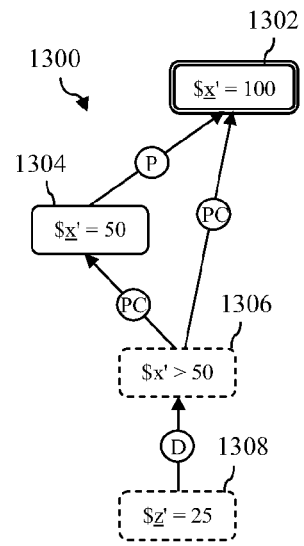
FIG. 13A  FIG. 13B  FIG. 13C
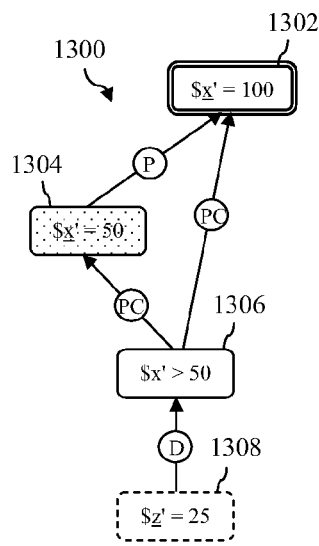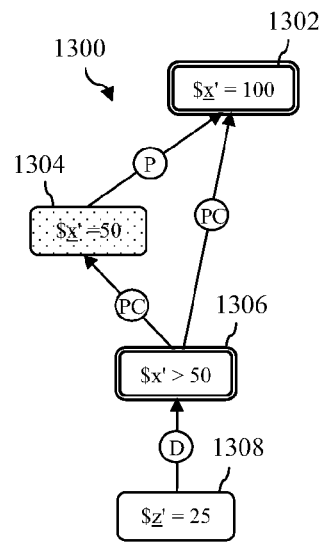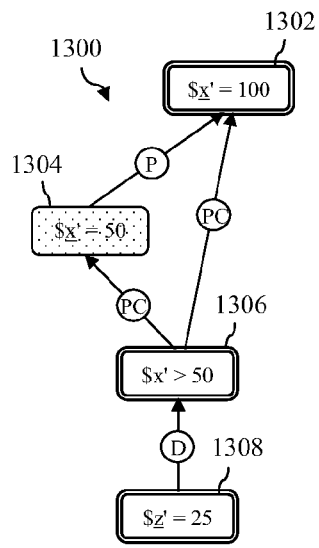
FIG. 13D  FIG. 13E  FIG. 13F

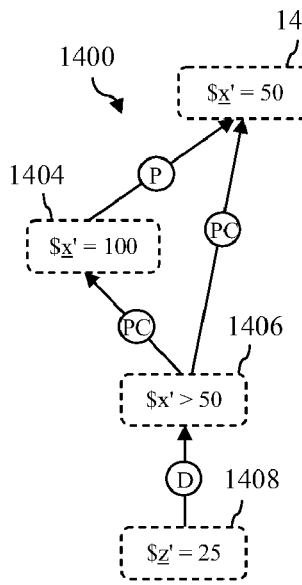 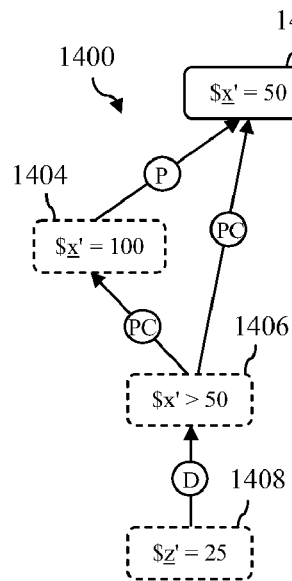 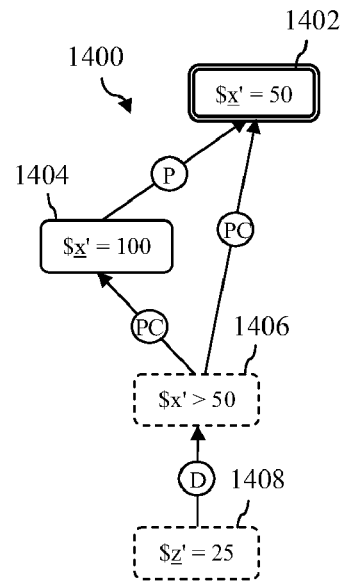
FIG. 14A  FIG. 14B  FIG. 14C
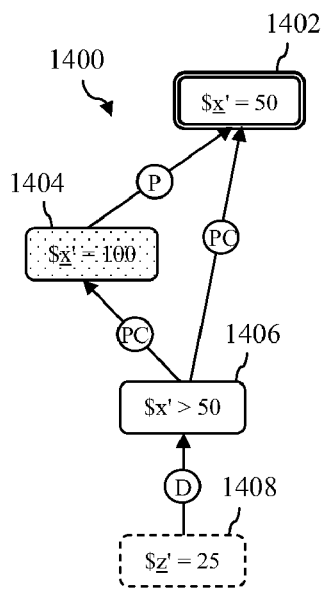 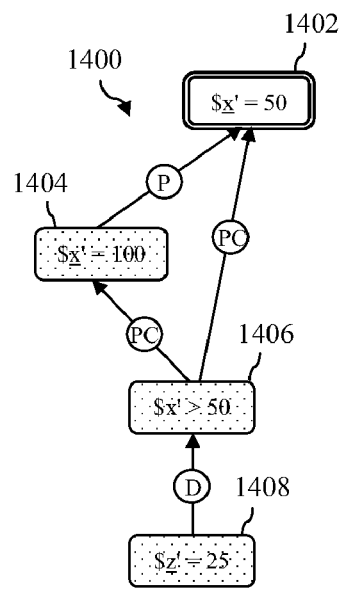
FIG. 14D  FIG. 14E

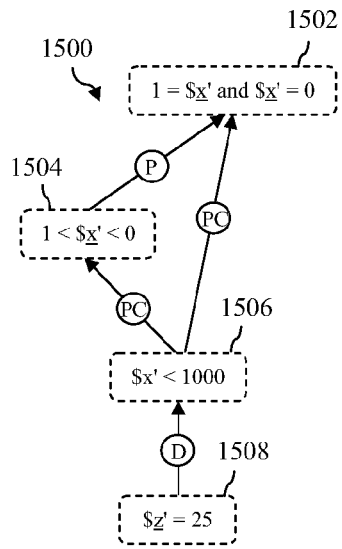
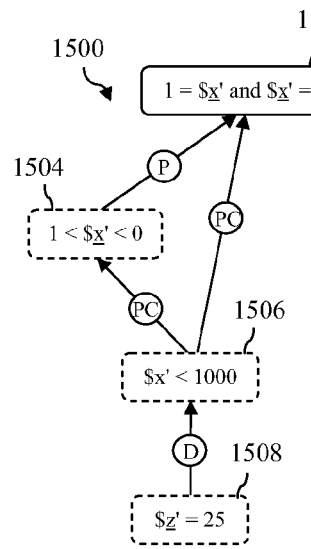
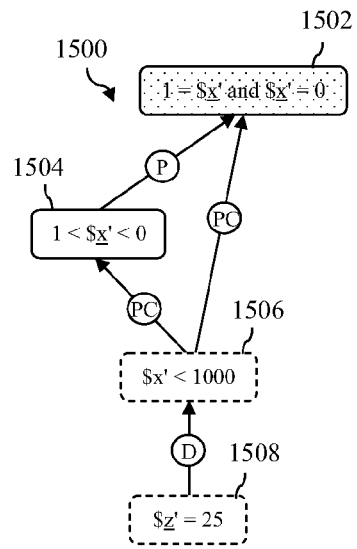
FIG. 15A        FIG. 15B        FIG. 15C
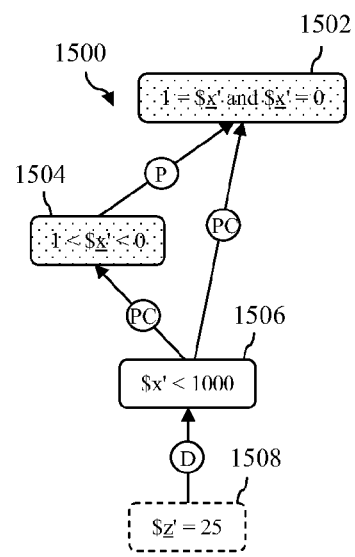
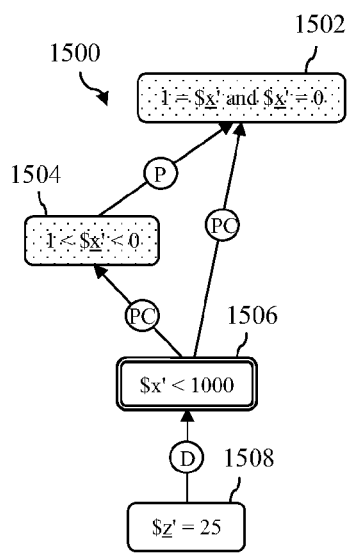
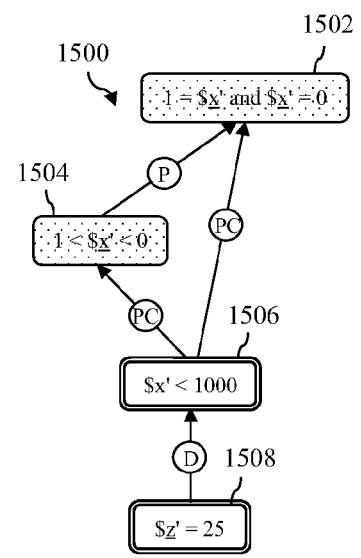
FIG. 15D        FIG. 15E        FIG. 15F

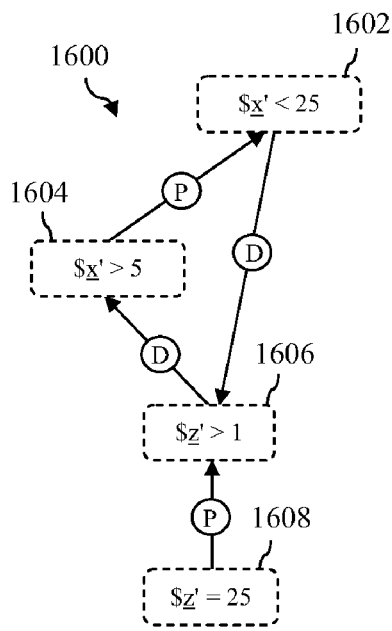
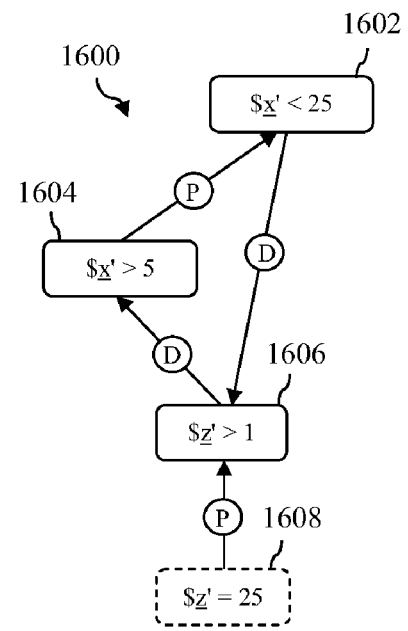
FIG. 16A  FIG. 16B
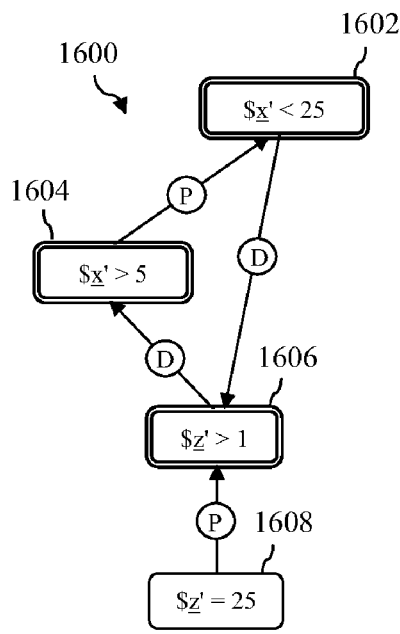
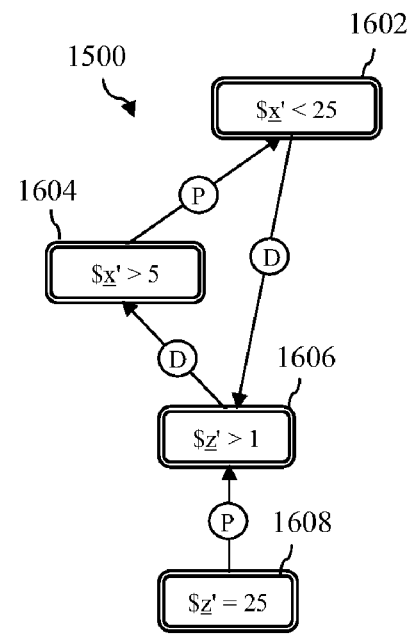
FIG. 16C  FIG. 16D

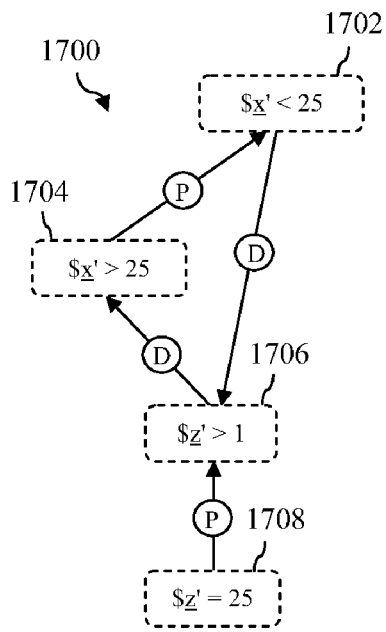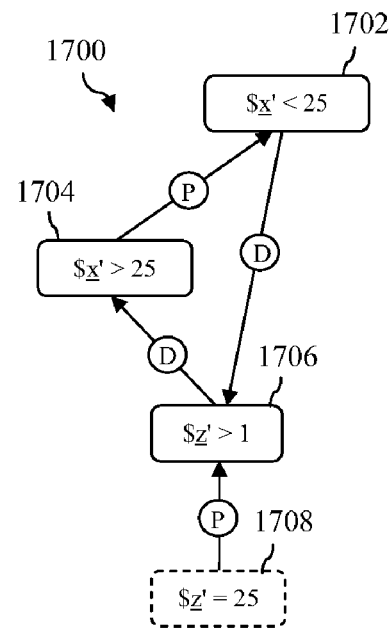
FIG. 17A     FIG. 17B
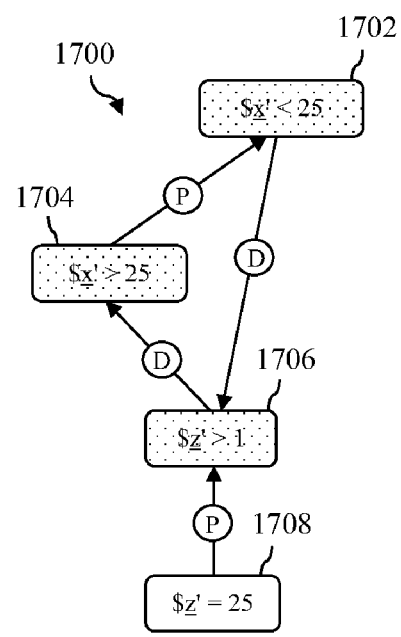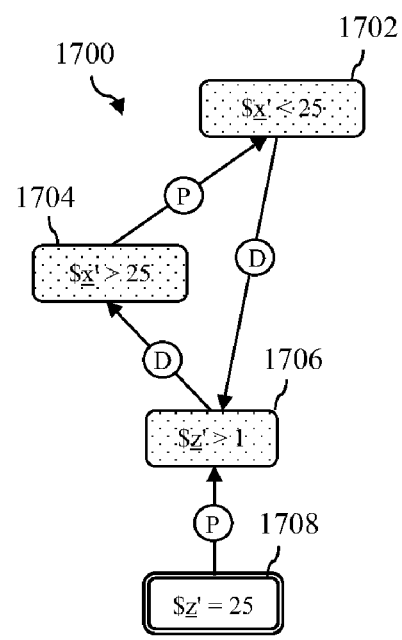
FIG. 17C     FIG. 17D

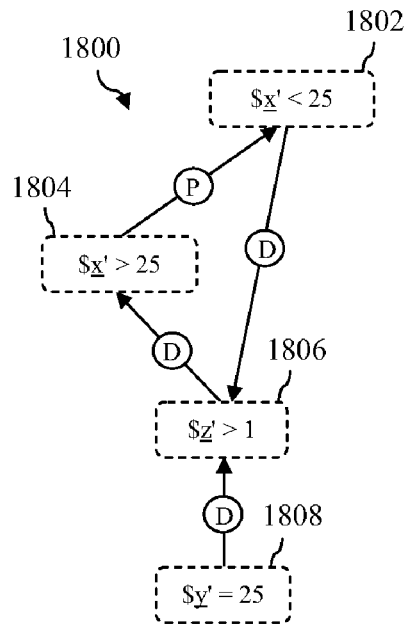 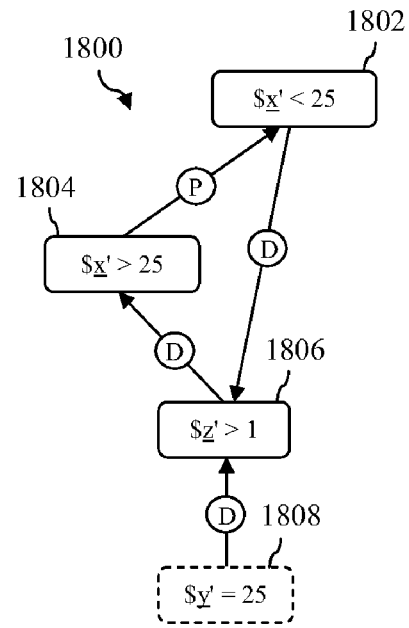
FIG. 18A  FIG. 18B
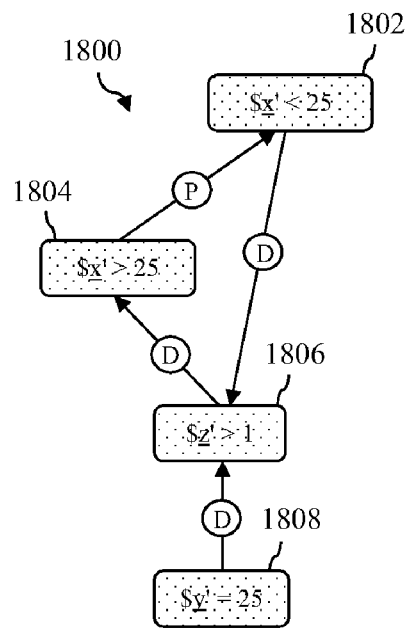
FIG. 18C

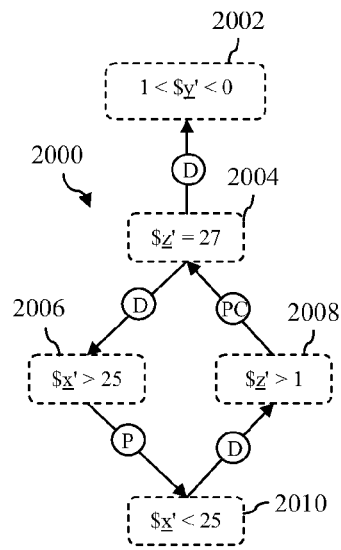
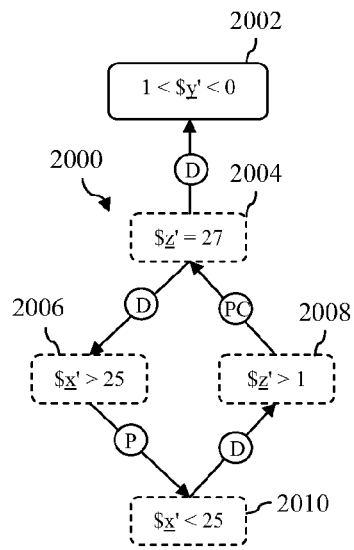
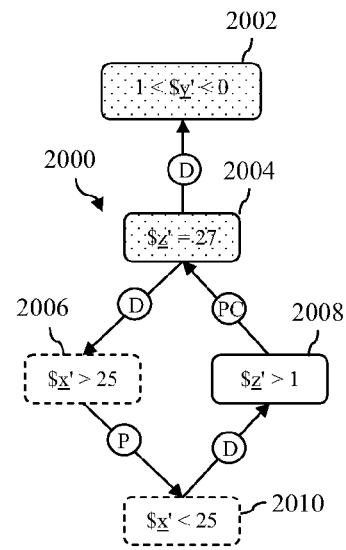
FIG. 20A         FIG. 20B         FIG. 20C
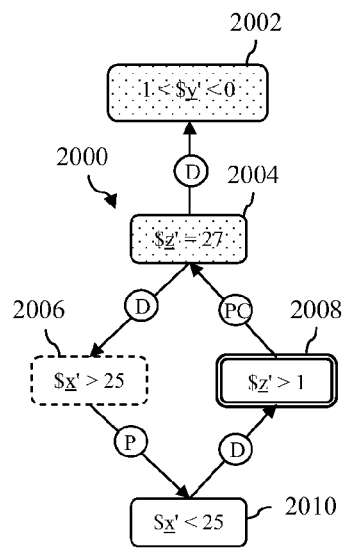
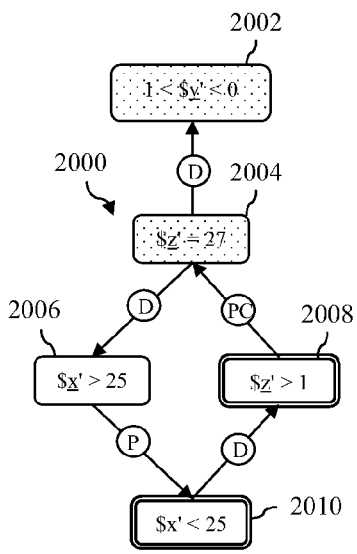
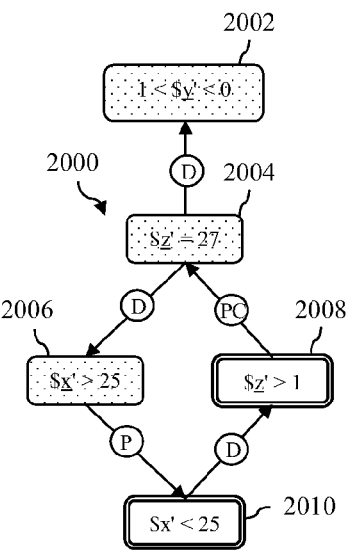
FIG. 20D         FIG. 20E         FIG. 20F

POLICY PROCESSOR FOR CONFIGURATION MANAGEMENT

BACKGROUND

Distributed computing networks, such as enterprise networks, may include a significantly large number of computers upon which are installed various assets, such as software programs and products. In certain enterprises, network administrators, information technology (IT) managers, or the like (collectively referred to as "IT management") are required to manage the configuration of assets installed on each computer. For many reasons, managing each asset individually may be a non-viable approach. Therefore, a centralized configuration management solution is needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A policy processor is described herein that may be used to implement a system for managing the configuration of assets in a distributed computing network, such as an enterprise network. The configuration management system enables IT managers or other authorized users to declare policies that describe an intent or goal in regard to managing the configuration of a targeted asset or assets. The configuration management system then automatically enacts the policies. In one implementation, the configuration management system is implemented using standard protocols and data models, thereby providing a single platform that can be used to manage the configuration of a variety of diverse assets in a distributed computing network.

In one implementation of the configuration management system, one or more policy authorities operates to receive, store and distribute policies to one or more other policy authorities or managed nodes. A policy processor within each managed node operates to evaluate and enact received policies. Enactment of the policies includes using a conflict resolution model to determine what to do if incompatible policies are encountered. The policy processor may also report on the results of the enactment.

In accordance with one implementation, the policy processor includes at least a document processor, a rule processor and a graph processor. The document processor is configured to receive one or more policy documents applicable to a target entity and to extract a plurality of policy rules therefrom. Each policy rule includes a constraint expression that references zero or more configuration state variables associated with the target entity, wherein a reference to a configuration variable may include a mutable or non-mutable reference. The document processor is also configured to receive a conflict resolution model.

The rule processor is configured to construct a logical directed graph of the policy rules based on at least priority relationships between the policy rules, wherein priority relationships exist between policy rules that include constraint expressions having mutable references to the same configuration state variable and wherein the relative priority of the policy rules is determined in reference to the conflict resolution model.

The graph processor is configured to determine which policy rules are in effect and which are not in effect in an order specified by the logical directed graph. The graph processor determines that a policy rule is in effect if the constraint expression included within the policy rule is deemed mutually satisfiable with respect to each constraint expression included within each in-effect priority rule and determines that a policy rule is not in effect if the constraint expression included within the policy rule is deemed not mutually satisfiable with respect to a constraint expression included within at least one in-effect policy rule.

The foregoing rule processor may be configured to construct the logical directed graph based also on post-conditional relationships between the policy rules, wherein a post-conditional relationship exists between each policy rule that includes a non-mutable primed reference to a given configuration state variable and every policy rule that contains a mutable reference to the given configuration state variable. In accordance with such an embodiment, the graph processor may be configured to determine if a given policy rule is in effect only after determining whether other policy rules having a post-conditional relationship with the given policy rule are in effect or not in effect.

The foregoing rule processor may be configured to construct the logical directed graph based also on dependency relationships between the policy rules, wherein a dependency relationship exists between a first policy rule and a second policy rule if the first policy rule includes a condition indicating that the second policy rule must hold true for the first policy rule to be in effect. In accordance with such an embodiment, the graph processor may be configured to determine that a given policy rule is not in effect if the given policy rule depends, by virtue of a dependency relationship, on another policy rule that has been determined not to be in effect.

A computer-implemented method for managing the configuration state of a target entity is also described herein. In accordance with the method, a plurality of policy rules applicable to the target entity is received. A logical directed graph of the policy rules is constructed based on relationships between the policy rules. A determination is then made as to which policy rules are in effect and which are not in effect in an order specified by the logical directed graph.

A computer program product is also described herein. The computer program product comprises a computer-readable medium having computer program logic recorded thereon for enabling a processing unit to manage the configuration state of a target entity. The computer program logic includes first means, second means, third means and fourth means. The first means are for enabling the processing unit to receive a plurality of policy rules applicable to the target entity, wherein each policy rule includes a constraint expression that references zero or more configuration state variables associated with the target entity, wherein a reference to a configuration state variable may include a mutable or non-mutable reference. The second means are for enabling the processing unit to receive a conflict resolution model. The third means are for enabling the processing unit to construct a logical directed graph of the policy rules based on at least priority relationships between the policy rules, wherein priority relationships exist between policy rules that include constraint expressions having mutable references to the same configuration state variable and wherein the relative priority of the policy rules is determined in reference to the conflict resolution model. The fourth means are for enabling the processing unit to determine which policy rules are in effect and which are not in effect in an order specified by the logical directed graph. A policy rule is determined to be in effect if the constraint expression included within the policy rule is deemed mutually satisfiable with respect to each constraint expression included within each in-effect policy rule and a policy rule is determined not to be in effect if the constraint expression included within the policy rule is deemed not mutually satisfiable with respect to a constraint expression included within at least one in-effect policy rule.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 8A, 8B, 8C and 8D depict the processing of a sub-graph that includes a single priority relationship in accordance with an embodiment of the present invention.

FIGS. 9A, 9B, 9C, 9D and 9E depict the processing of a sub-graph that includes multiple priority relationships in accordance with an embodiment of the present invention.

FIGS. 10A, 10B and 10C depict the processing of a sub-graph that includes multiple dependency relationships in accordance with an embodiment of the present invention.

FIGS. 11A, 11B, 11C and 11D depict the processing of another sub-graph that includes multiple dependency relationships in accordance with an embodiment of the present invention.

FIGS. 12A, 12B, 12C, 12D, 12E and 12F depict the processing of a sub-graph that includes multiple post-conditional relationships in accordance with an embodiment of the present invention.

FIGS. 13A, 13B, 13C, 13D, 13E and 13F depict the processing of another sub-graph that includes multiple post-conditional relationships in accordance with an embodiment of the present invention.

FIGS. 14A, 14B, 14C, 14D and 14E depict the processing of another sub-graph that includes multiple post-conditional relationships in accordance with an embodiment of the present invention.

FIGS. 15A, 15B, 15C, 15D, 15E and 15F depict the processing of another sub-graph that includes multiple post-conditional relationships in accordance with an embodiment of the present invention.

FIGS. 16A, 16B, 16C and 16D depict the processing of a sub-graph that includes a cycle in accordance with an embodiment of the present invention.

FIGS. 17A, 17B, 17C and 17D depict the processing of another sub-graph that includes a cycle in accordance with an embodiment of the present invention.

FIGS. 18A, 18B and 18C depict the processing of another sub-graph that includes a cycle in accordance with an embodiment of the present invention.

FIGS. 20A, 20B, 20C, 20D, 20E and 20F depict the processing of another sub-graph that includes a cycle in accordance with an embodiment of the present invention.

Figure 1:
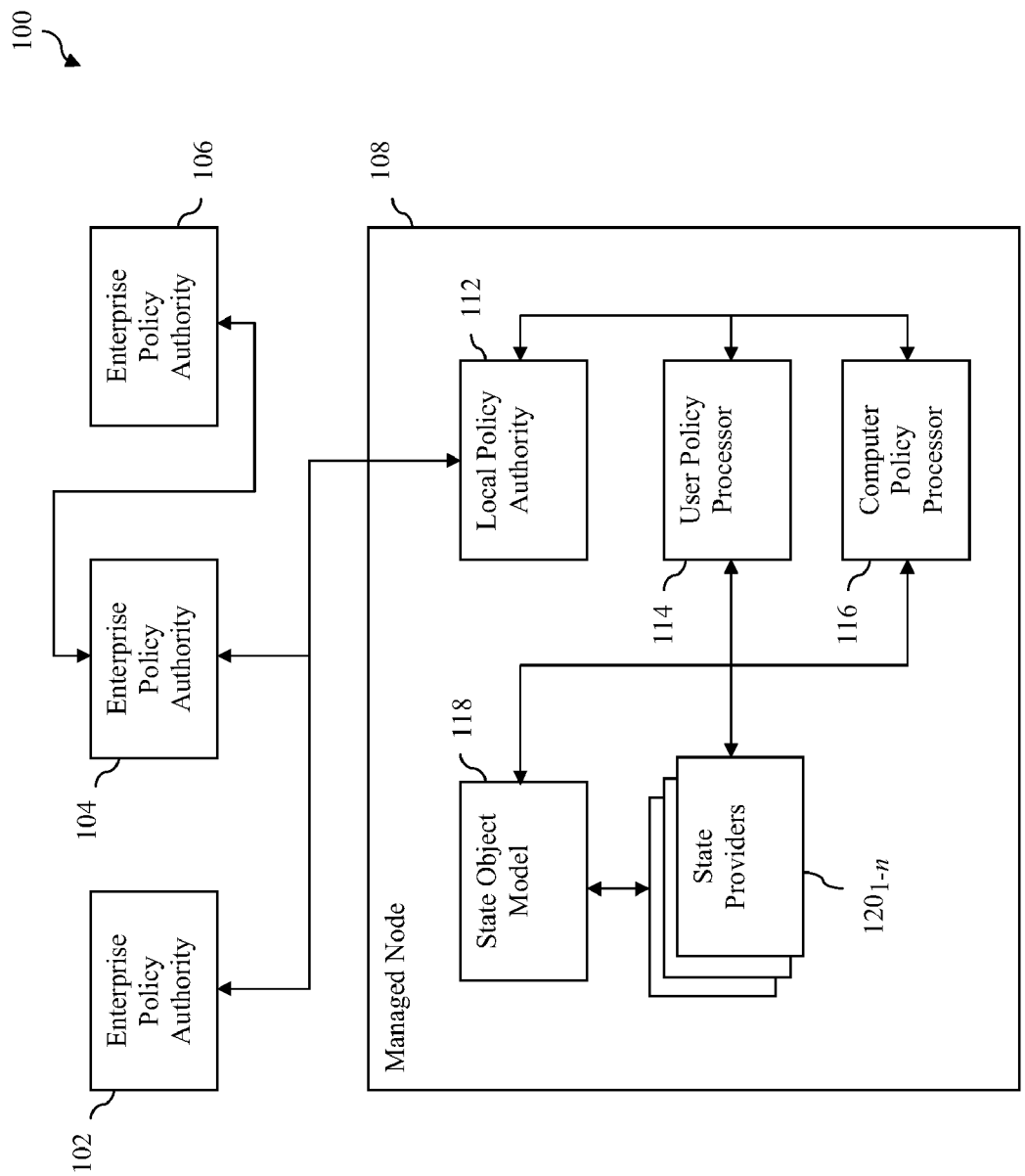
FIG. 1 is a block diagram of an example configuration management system in which an embodiment of the present invention may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Terminology

Various terms will now be defined that will be useful in describing certain embodiments of the present invention. These definitions have been provided to facilitate understanding of the embodiments described herein and are not intended to limit the present invention.

As used herein, the term "policy" refers to an intent or goal in regard to managing a configurable aspect of one or more entities. The one or more entities may comprise, for example, one or more computers or one or more software or hardware components of one or more computers. The one or more computers may comprise a portion of a distributed computing network. An expression of a policy may include one or more policy rules. A "policy authority" refers to an entity capable of issuing a policy and a "policy processor" refers to an entity capable of evaluating and enacting a policy issued by a policy authority.

The term "document" is used herein to refer to a unit of data transfer between policy authorities and policy processors. In accordance with one implementation, multiple document types are supported. Such document types may include, for example, policy documents, report documents, or the like. Each document type may have a unique schema. In a particular implementation, a document comprises a Common Information Model (CIM) class instance. In accordance with such an implementation, the encodings of the documents can be any industry standard coding of CIM class instances.

The term "target" is used herein to refer to an entity whose configuration state is to be verified and/or altered by the enactment of a policy.

In one implementation, the configuration state of each managed entity is modeled using a modeling language. For example, a standard modeling language such as CIM may be used. The term "configuration point" is used herein to refer to a single piece of modeled configuration state, such as the setting of a variable associated with the configuration of a managed entity (also referred to herein as a "configuration state variable"). In one implementation, state is modeled by CIM class instances and configuration points generally map to properties of these classes.

As used herein, the term "configuration point collection" refers to a defined set of configuration points. In certain implementations described herein, the reading and writing of configuration state data is performed at the collection level rather than at the individual configuration point level. However, either approach to the reading and writing of configuration state data may be used depending upon the implementation. In a particular implementation, a configuration point collection is represented by a modeling language class, such as a CIM class.

The term "state provider" is used herein to describe a software entity that acts as the source of configuration state data for a managed entity. In particular, a state provider is configured to generate data representative of the modeled configuration state of a managed entity and to provide such data to a policy processor for policy evaluation. This process may be referred to herein as the discovery or reading of configuration state data. A state provider is also configured to receive data representative of the modeled configuration state of a managed entity from a policy processor after policy enactment has been performed and to modify the state of the managed entity in accordance with such data. This process may be referred to herein as reification or writing of configuration state data. In one implementation, configuration state data is received from and sent to a state provider in the form of a configuration point collection. A state management agent such as Web-Based Enterprise Management (WBEM) may be used for communicating configuration state data between a policy processor and a state provider. For example, a particular implementation of WBEM such as Windows Management Instrumentation (WMI) may be used.

The term "policy rule" is used herein to refer to an expression of intent in the form of a set of constraints over a set of configuration state variables related to a given target. Each variable may be bound to a particular configuration point. In one implementation, a policy rule includes three parts: a declaration of variables referenced by the policy rule, a constraint expression over the referenced variables that must hold true if the policy rule is in effect, and an optional condition, which is an expression over a list of other policy rules that must hold true for the policy rule to be in effect.

The constraint expressions in policy rules may be encoded, for example, using a standard rule-based validation language, such as Object Constraint Language (OCL). However, this is only an example and other means for encoding constraint expressions may be used.

In one embodiment, each variable identified in the declaration can be referenced as either mutable or non-mutable. If a variable is referenced as mutable, this indicates that the state of the variable may be modified by a policy processor to satisfy the policy rule constraint expression. If a variable is referenced as non-mutable, this indicates that the policy rule is "examination-only" with respect to the variable and that the state of the variable may not be modified by a policy processor to satisfy the policy rule's constraint expression.

A non-mutable reference may be further designated as primed or unprimed. If a policy rule refers to a variable as non-mutable and primed, then the policy rule references the value of the variable after solving of the variable has occurred. If a policy rule refers to a variable as non-mutable and unprimed, then the policy rule references the value of the variable before solving of the variable has occurred. Whether a non-mutable reference is primed or unprimed may be explicitly stated in a policy rule or inferred by a policy processor at the time of solving.

As used herein, the term "conflict" refers to a condition that arises when constraints in two or more policy rules express incompatible intent over a given mutable variable.

A "conflict resolution model" refers to a set of rules that are used to determine the relative priority of policy rules that operate over a given variable. A conflict resolution model may be authored by a network administrator or some other authority. In an embodiment, multiple federated authorities may author conflict resolution models which are then aggregated into a single conflict resolution model for use by a policy processor. Rules within a conflict resolution model may specify an ordering based on a property or properties of a policy rule or a policy that includes the policy rule. Depending upon the implementation, the function of prioritizing policy rules may be performed by a policy processor and/or one or more external rule-comparison modules referenced by a policy processor.

As used herein, the term "rule graph" refers to a logical directed graph that models relationships between policy rules and provides an ordering for processing such policy rules. In a rule graph, policy rules may be represented as nodes and relationships between rules are represented as links or edges between nodes. In one embodiment, a rule graph models at least three types of relationships between policy rules: priority relationships, post-conditional relationships and dependency relationships.

A priority relationship specifies the relative priority between two policy rules that operate over the same mutable variable. As noted above, a conflict resolution model provides a mechanism by which such relative priorities may be determined. In an embodiment, two policy rules that share a priority relationship and that have different priorities are connected by a single priority relationship link while two policy rules that share a priority relationship and that have equal priority are connected by reciprocal priority relationship links that form a cycle.

A post-conditional relationship exists between two policy rules when one of the policy rules includes a primed non-mutable reference to a given variable and the other policy rule includes a mutable reference to the same variable. The post-conditional relationship signifies that the policy rule that includes the mutable reference to the variable should be solved for before any expressions in the policy rule that includes the primed non-mutable reference to the variable are evaluated. In an embodiment, a post-conditional relationship is represented in a rule graph by a post-conditional relationship link between policy rules.

A dependency relationship exists between two policy rules if one of the policy rules must hold true for the other policy rule to be in effect. As noted above, dependency relationships may be specified by a condition portion of a policy rule. In an embodiment, a dependency relationship is represented in a rule graph by a dependency relationship link between policy rules.

In an embodiment, a rule graph may comprise a single logical graph that is composed of multiple disconnected sub-graphs. If two sub-graphs within a rule graph are disconnected, this implies that there exists no relationship between the policy rules represented by each sub-graph. Disconnected sub-graphs may be processed independently from other disconnected sub-graphs.

C. Example Operating Environment

FIG. 1 is a block diagram of an example configuration management system 100 in which an embodiment of the present invention may operate. As shown in FIG. 1, system 100 includes a plurality of enterprise policy authorities 102, 104 and 106 and a managed node 108. Each of enterprise policy authorities 102, 104 and 106 comprises an entity that is capable of issuing polices, wherein each policy issued may include one or more policy rules that relate to the configuration of managed node 108. In an embodiment, policies are issued by enterprise policy authorities 102, 104 and 106 in the form of policy documents.

As shown in FIG. 1, enterprise policy authorities 102 and 104 are each connected to managed node 108 and are thus capable of issuing policies directly thereto. Enterprise policy authority 106 is connected to enterprise policy authority 104 and thus may only issue policies to managed node 108 in an indirect manner (i.e., via enterprise policy authority 104). In one example embodiment, the protocol used for communicating between enterprise policy authorities 102, 104 and managed node 108 and for communicating between enterprise policy authority 106 and enterprise policy authority 104 comprises a Web-services-based management protocol, such as the WS-Management protocol. However, this example is not intended to be limiting and other protocols may be used.

Enterprise policy authorities 102, 104 and 106 may each represent a computer, such as a server computer, within a distributed computing network such as an enterprise network. Alternatively, enterprise policy authorities 102, 104 and 106 may represent software entities executed by one or more computers within a distributed computing network. Also, depending upon the operating environment, enterprise policy authorities 102, 104 and 106 may all be associated with the same enterprise network or may be associated with different enterprise networks.

Managed node 108 comprises an entity, such as a computer, that is capable of enacting policies issued by any of enterprise policy authorities 102, 104 and 106. As shown in FIG. 1, managed node 108 includes a local policy authority 112. Local policy authority 112 is adapted to store policies that have either been generated locally with respect to managed node 108 (e.g., by interaction between a user and a user interface of managed node 108) or that have been received from one or more external policy authorities, such as from enterprise policy authorities 102, 104 and 106. Local policy authority 112 may be adapted to automatically retrieve such policies in accordance with some predefined scheduled. Alternatively or additionally, enterprise policy authorities 102, 104 and 106 may each be adapted to automatically provide such policies to local policy authority 112 in accordance with some predefined schedule.

As further shown in FIG. 1, managed node 108 includes a user policy processor 114 and a computer policy processor 116. Each of these entities is adapted to retrieve policies from local policy authority 112 and to enact the policies to verify or alter the configuration state of a target associated with managed node 108. User policy processor 114 is adapted to perform these functions when the target is a user associated with managed node 108 while computer policy processor 116 is adapted to perform these functions when the target is managed node 108 itself. It should be noted that other types of policy processors other than user policy processor 114 and computer policy processor 116 may be implemented on managed node 108. Also, depending upon the implementation, user policy processor 114 and/or computer policy processor 116 may be adapted to retrieve policies from an external policy authority, such as any of enterprise policy authorities 102, 104 and 106.

As will be described in more detail herein, policy processors 114 and 116 are each adapted to obtain a model of the configuration state of the target from one or more state providers $120_{1-n}$. For example, each state provider $120_{1-n}$ may be invoked by a policy processor to provide a model of the configuration state of a corresponding software program associated with the target. This model is then used by the policy processor to evaluate and enact policies. As also will be described in more detail herein, policy processors 114 and 116 are each adapted to modify the model of the configuration state of the target responsive to the enactment of one or more policies and to invoke state providers $120_{1-n}$ to modify the configuration state of the target based on the modified model. For example, one or more of state providers $120_{1-n}$ may be invoked to modify the configuration state of a corresponding software program associated with the target based on the modified model.

In one embodiment, model definitions that can be used to define the configuration state of the target are stored as a state object model 118 that is accessible to both state providers $120_{1-n}$ and policy processors 114 and 116. A standard modeling language, such as CIM, may be used for modeling configuration state. In an embodiment in which CIM is used, state object model 118 comprises a CIM repository.

A state management agent such as WBEM may be used by policy processors 114, 116 and state providers $120_{1-n}$ to read and write modeled configuration state information. For example, a particular implementation of WBEM such as WMI may be used. A Web-services-based protocol such as WS-Management may be used to facilitate access by policy processors 114, 116 to state providers $120_{1-n}$ and state object model 118, although this is only an example and other protocols may be used.

D. Example Policy Processor

Figure 2:
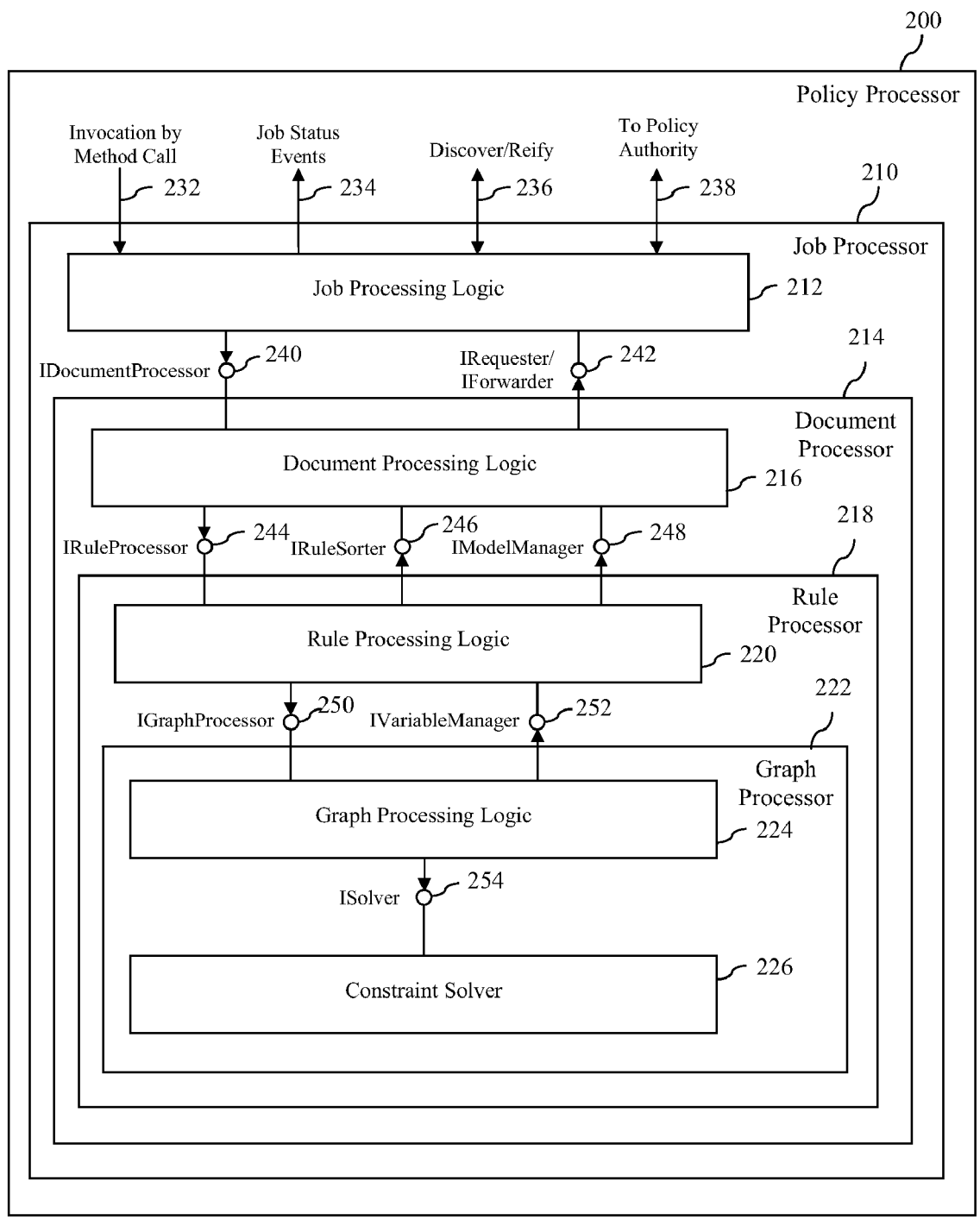
FIG. 2 is a block diagram of an example policy processor in accordance with an embodiment of the present invention.

FIG. 2 is a block diagram of an example policy processor 200 in accordance with an embodiment of the present invention. In an embodiment, policy processor 200 comprises software logic installed and executed on a managed node, such as managed node 108 as described above in reference to system 100 of FIG. 1. For example, policy processor 200 may represent user policy processor 114 or computer policy processor 116. As shown in FIG. 2, policy processor 200 includes a series of nested processing elements including a job processor 210, a document processor 214, a rule processor 218 and a graph processor 222. Each of these elements will now be briefly described.

Job processor 210 comprises job processing logic 212 and document processor 214. Job processing logic 212 is adapted to initiate the enactment of policies over a particular target, a process which may be referred to herein as a job. Among other functions, job processing logic 212 is responsible for identifying the target for which policy enactment will be performed and for managing all communication between job processor 210 and external entities.

Job processor 210 includes a number of publicly exposed interfaces. These include a first interface 232 by which job processor 210 may be invoked by an external entity, a second interface 234 by which job processor 210 may report job status and event information to the invoking entity and a third interface 236 by which job processor 210 may obtain configuration state information from or provide configuration state information to one or more state providers (such as state providers $120_{1-n}$ described above in reference to FIG. 1). Depending upon the implementation, a single interface of job processor 210 may perform the combined functions of two or more of first interface 232, second interface 234 and third interface 236.

Job processor 210 also has an outbound connection 238 by which job processor 210 may communicate with an external policy authority (such as local policy authority 112 described above in reference to FIG. 1), wherein such communication may include, for example, the receipt of policy documents from the external policy authority.

Document processor 214 includes document processing logic 216 and rule processor 218. Document processing logic 216 is adapted to receive policy documents from job processing logic 212 and to extract policy rules therefrom for subsequent processing by rule processor 218. Document processing logic 216 is also adapted to request and receive configuration state information from one or more state providers (such as state providers $120_{1-n}$) for examination and/or modification by rule processor 218 and to forward configuration state information to the one or more state providers. In an embodiment, document processing logic 214 stores and manages such configuration state information in a local cache. Document processing logic 214 is further adapted to obtain a conflict resolution model from an external entity and to use the model to determine the relative priority of certain policy rules being processed by rule processor 218. The external entity from which the conflict resolution model is obtained may comprise, for example, local policy authority 112 or some other entity that is internal or external with respect to managed node 108. Depending upon the implementation, document processing logic 214 may also interact with a set of external rule-comparison modules in performing the prioritization function.

Job processing logic 212 and document processing logic 216 share at least a first interface 240 and a second interface 242. First interface 240 (denoted "IDocumentProcessor") provides at least a means by which job processing logic 212 may transfer policy documents to document processing logic 216. Second interface 242 (denoted "IRequester/iForwarder) provides at least a means by which document processing logic 216 may request/forward configuration state information to/from one or more state providers via job processing logic 212. Second interface 242 may also provide a means by which document processing logic 216 may retrieve a conflict resolution model from an external entity via job processing logic 212.

Rule processor 218 includes rule processing logic 220 and graph processor 222. Rule processing logic 220 is adapted to receive policy rules from document processing logic 216 and to create a logical rule graph based on those rules in a manner that will be described in more detail herein. The rule graph created by rule processing logic 220 models relationships between policy rules and provides an ordering by which graph processor 222 may process such rules. To construct the rule graph, rule processing logic 220 is adapted to submit rule sorting requests to document processing logic 216. Responsive to receiving such a request, document processing logic 216 determines the relative priority of policy rules referenced by the request in accordance with a previously-retrieved conflict resolution model. Document processing logic 216 then returns priority information associated with the referenced policy rules to rule processing logic 220 for use in constructing the rule graph.

Rule processing logic 220 and document processing logic 216 share at least a first interface 244, a second interface 246 and a third interface 248. First interface 214 (denoted "IRuleProcessor") provides at least a means by which document processing logic 216 may transfer policy rules to rule processing logic 220. Second interface 246 (denoted "IRuleSorter") provides at least a means by which rule processing logic 220 may submit rule sorting requests to document processing logic 216 and by which document processing logic 216 may provide priority information to rule processing logic 220 responsive to receiving such sorting requests. Third interface 248 (denoted "IModelManager") provides at least a means by which rule processing logic 220 may issue a request to document processing logic 216 for modeled configuration state information referenced by a policy rule and by which rule processing logic 220 may forward modified modeled configuration state information to document processing logic 216.

Graph processor 224 includes graph processing logic 224 and a constraint solver 226. Graph processing logic 224 is adapted to process the rule graph created by rule processing logic 220 to determine which of the policy rules represented in the rule graph are in effect and which are not in effect, and to provide a solution for the set of policy rules that are determined to be in effect. To perform this function, graph processing logic 224 interacts with a constraint solver 226 via an interface 254 (denoted "ISolver") in a manner that will be described in more detail herein. Constraint solver operates to determine whether constraint expressions within policy rules can be satisfied or not depending upon various factors. The processing of the rule graph by graph processor 224 may result in the change of state of certain variables referenced by the policy rules included within the rule graph. Graph processor 224 provides these modified variable values to rule processing logic 220 to facilitate reification of configuration state information associated with the target. Graph processor 224 also provides the results of the processing of the rule graph to rule processing logic 220 to facilitate the generation of reports relating to the outcome of the policy processing job. The reports are encapsulated within documents by document processing logic 216 and forwarded to one or more external entities.

Graph processing logic 224 and rule processing logic 220 share at least a first interface 250 and a second interface 252. First interface 250 (denoted "IGraphProcessor") provides at least a means by which rule processing logic 220 may pass data representative of a rule graph (including, for example, data representative of policy rules and relationships between such policy rules) to graph processing logic 222. Second interface 252 (denoted "IVariableManager") provides at least a means by which graph processing logic 224 may issue a request to rule processing logic 216 for the value of a variable referenced by a policy rule and by which graph processing logic 224 may forward modified variable values to rule processing logic 220.

E. Example Policy Processing Method

Figure 3:
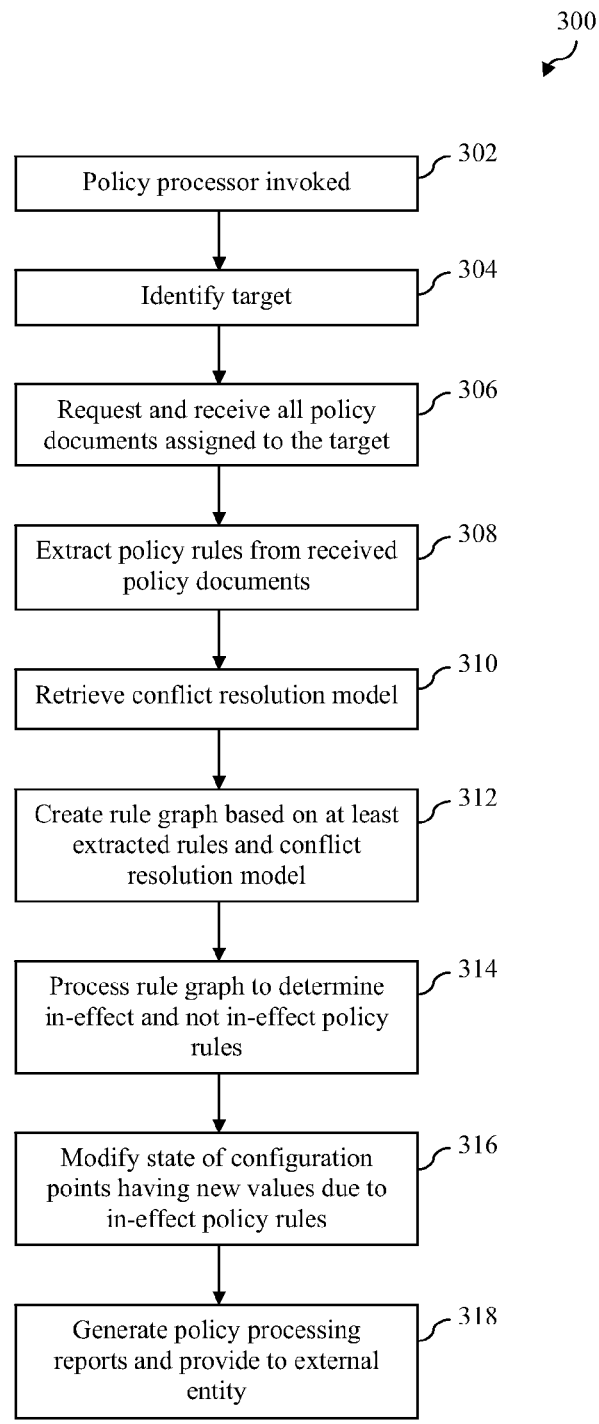
FIG. 3 depicts a flowchart of an example method of operation of a policy processor in accordance with an embodiment of the present invention.

FIG. 3 depicts a flowchart 300 of an example method of operation of a policy processor in accordance with an embodiment of the present invention. The steps of flowchart 300 will now be described with reference to various logical and/or physical entities described above in reference to FIGS. 1 and 2. However, persons skilled in the relevant art(s) will readily appreciate that the method need not be implemented using such entities.

As shown in FIG. 3, the method of flowchart 300 begins at step 302, in which policy processor 200 is invoked by local policy authority 112 or some other entity, such as some other software entity executing on managed node 108. Policy processor 200 may be invoked by an entity responsive to the occurrence of one or more events. Depending upon the implementation, such events may include but are not limited to explicit invocation of policy processor 200 by a user through interaction with managed node 108, automatic invocation of policy processor 200 based on a schedule or timer, or the like. In one embodiment, policy processor 200 is invoked via the placement of a method call by another entity. The method call may be defined in accordance with an entity management specification such as WBEM or a particular implementation of WBEM, such as WMI.

At step 304, responsive to the invocation, job processing logic 212 within job processor 210 identifies a target for which policy processor 200 was invoked. In one embodiment, the target may be managed node 108 itself or one of a set of one or more users associated with managed node 108. In an embodiment in which policy processor 200 is configured to serve only one target, the identity of the target may be implicit in the invocation of policy processor 200. In an embodiment in which policy processor is configured to serve multiple targets, information necessary for identifying the target is conveyed to policy processor 200. This information may be conveyed, for example, as part of the invocation process of step 302. For example, in one implementation, information necessary for identifying the target is conveyed as part of a method call used to invoke policy processor 200 during step 302.

At step 306, job processing logic 212 requests all policy documents that are assigned to the target identified during step 304. In an alternate implementation, this request arises from document processor 214 and is relayed to the appropriate entity via an interface of job processor 210. In one embodiment, the request is issued to and serviced by local policy authority 112, which is configured to store locally-generated policy documents as well as policy documents that have been received from one or more remote policy authorities (such as enterprise policy authorities 102, 104 and 106 shown in FIG. 1) as previously described. In an alternate implementation, the request is issued to and optionally serviced by multiple policy authorities, each of which may be either remote or local with respect to managed node 108. Job processing logic 212 passes the received documents to document processor 214.

At step 308, document processing logic 216 within document processor 214 extracts one or more policy rules from each of the documents received during step 306 and passes the policy rules to rule processor 218. At step 310, document processing logic 216 retrieves a conflict resolution model for use in resolving conflicts among the policy rules. The conflict resolution model may be retrieved, for example, from local policy authority 112 or some other entity as discussed above.

At step 312, rule processing logic 220 within rule processor 218 creates a logical rule graph based on at least the rules extracted during step 308 and the conflict resolution model retrieved during step 310. One manner by which rule processing logic 220 may create the rule graph will be described in detail below in reference to flowchart 400 of FIG. 4. In an embodiment, rule processing logic 220 does not utilize the conflict resolution model directly when creating the rule graph but instead submits rule sorting requests to document processing logic 216, which utilizes the conflict resolution model to determine the relative priority of rules referenced by the requests.

At step 314, rule processing logic 220 invokes graph processing logic 224 within graph processor 222 to process the rule graph to determine which of the policy rules represented in the rule graph are in effect and which are not in effect. The manner in which rule processing logic 220 and graph processing logic 224 perform this function will be described in detail below in reference to flowchart 500 of FIG. 5 and flowchart 600 of FIG. 6.

The enactment of in-effect policy rules by graph processing logic 224 may result in the modification of certain mutable variables referenced by the in-effect policy rules. Responsive to the modification of these mutable variables, rule processing logic 220 requests that document processing logic 216 modify the configuration points associated with mutable variables that are stored in a local cache as shown at step 316. After all changes to the configuration points affected by in-effect policies have been determined, document processing logic 216 or job processing logic 212 may then request that the changed state of these configuration points be written back to the target identified in step 304, depending upon the implementation. In one implementation, whether such reification occurs is dependent upon the value of a configurable parameter that is analyzed at the time policy processor 200 is invoked or at some time during the execution of the policy processing job.

At step 318, document processing logic 216 generates one or more policy processing reports based at least in part on information received from rule processing logic 220 and graph processing logic 224 during the execution of step 314. The policy processing reports may include such information as an overall status of the policy enactment process, an identification of variables or configuration points that were modified by the policy enactment process and their new values, a list of policy rules that are in effect, a list of policy rules that are not in effect and a description of a reason why each policy rule is not in effect, and an identification of which policy rules contributed to the value of a given variable or configuration point.

Figure 4:
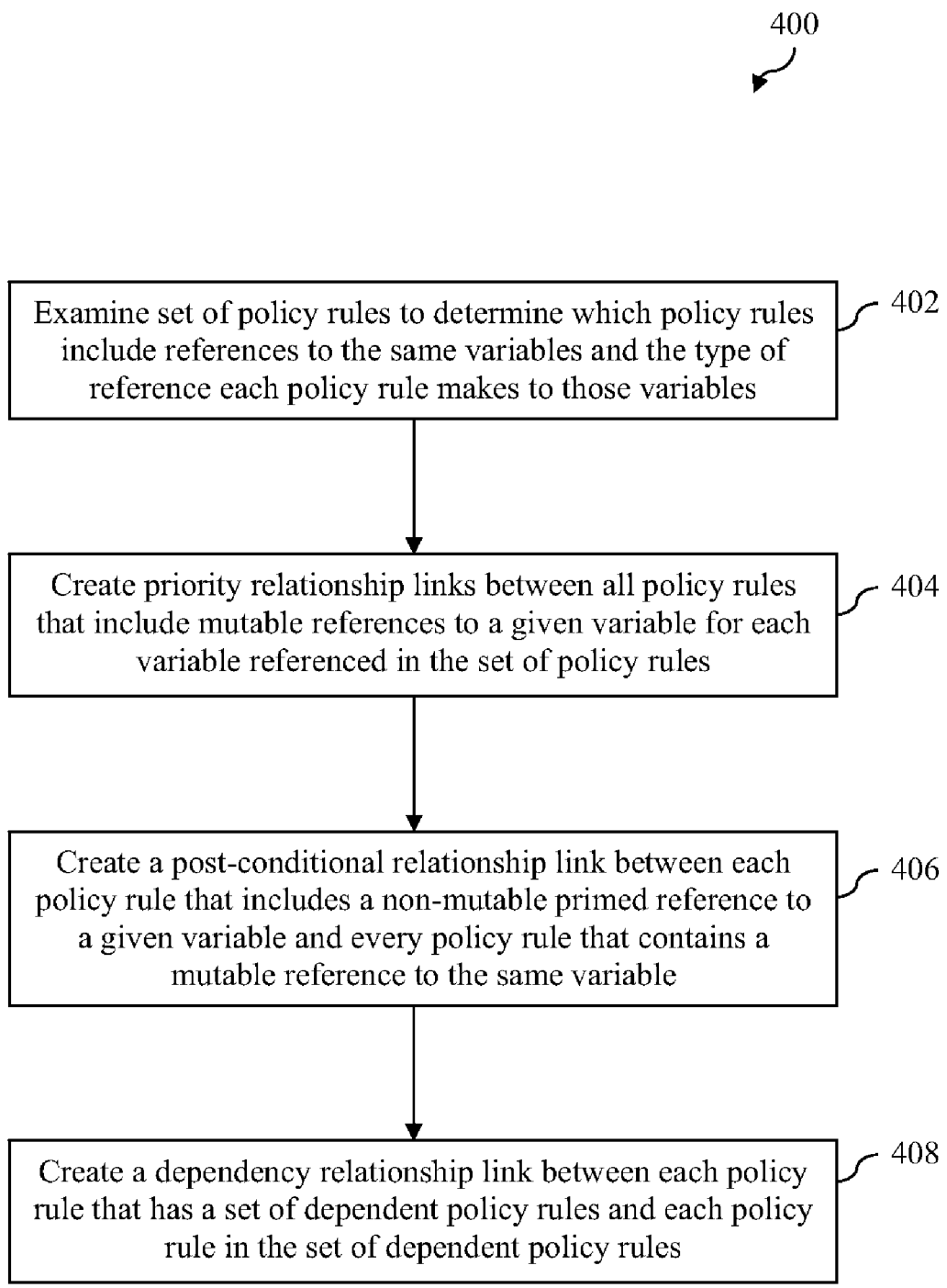
FIG. 4 depicts a flowchart of a method by which a policy processor may construct a rule graph in accordance with an embodiment of the present invention.

FIG. 4 depicts a flowchart 400 of an example method by which rule processing logic 220 within rule processor 218 may construct a rule graph in accordance with an embodiment of the present invention. As shown in FIG. 4, the method of flowchart 400 begins at step 402, in which rule processing logic 220 examines a set of policy rules received from document processing logic 216 to determine which policy rules operate over the same variables and the type of reference each policy rule makes to those variables. As noted in the terminology section above, a reference to a variable may be a mutable reference, a non-mutable primed reference, or a non-mutable unprimed reference.

At step 404, rule processing logic 220 creates priority relationship links between all policy rules that include mutable references to a given variable for each variable referenced in the set of policy rules, thereby creating a connected sub-graph of policy rules for each variable. If a policy rule references multiple variables, it may belong in multiple connected sub-graphs. To perform step 404, rule processing logic 220 determines the relative priority of each policy rule that includes a mutable reference to the same variable. Rule processing logic 220 may perform this function by submitting rule sorting requests to document processing logic 216 for resolution in accordance with a conflict resolution model as previously described.

When two policy rules that share a priority relationship have different priorities, rule processing logic 220 connect the policy rules by a single priority relationship link. When two policy rules that share a priority relationship have equal priority, rule processing logic 220 connects the policy rules by reciprocal priority relationship links that form a cycle.

At step 406, rule processing logic 220 creates a post-conditional relationship link between each policy rule that contains a non-mutable primed reference to a given variable and every policy rule that contains a mutable reference to the same variable. This is done to ensure that the policy rules that include mutable references to the variable are solved for before any expressions in the policy rule that includes the primed non-mutable reference to the variable are evaluated.

At step 408, rule processing logic 220 creates a dependency relationship link between each policy rule that has a set of dependent policy rules and each policy rule in the set of dependent policy rules. As described above, dependencies between policy rules may be specified by a condition portion of a policy rule.

After the method of flowchart 400 is complete, a rule graph comprising a series of disconnected sub-graphs will have been created based on the set of policy rules that were received during step 402. If two sub-graphs within the rule graph are disconnected, this implies that there exists no relationship between the policy rules represented by each sub-graph. Examples of various disconnected sub-graphs that may be created by the method of flowchart 400 will be described below in Section F.

It is noted that steps 404, 406 and 408 are not ordered. Any ordering of these steps is acceptable in accordance with various embodiments of the present invention. For example, while one implementation may order the steps, an alternative multiprocessing approach over a thread-safe graph object may also be used.

Figure 5:
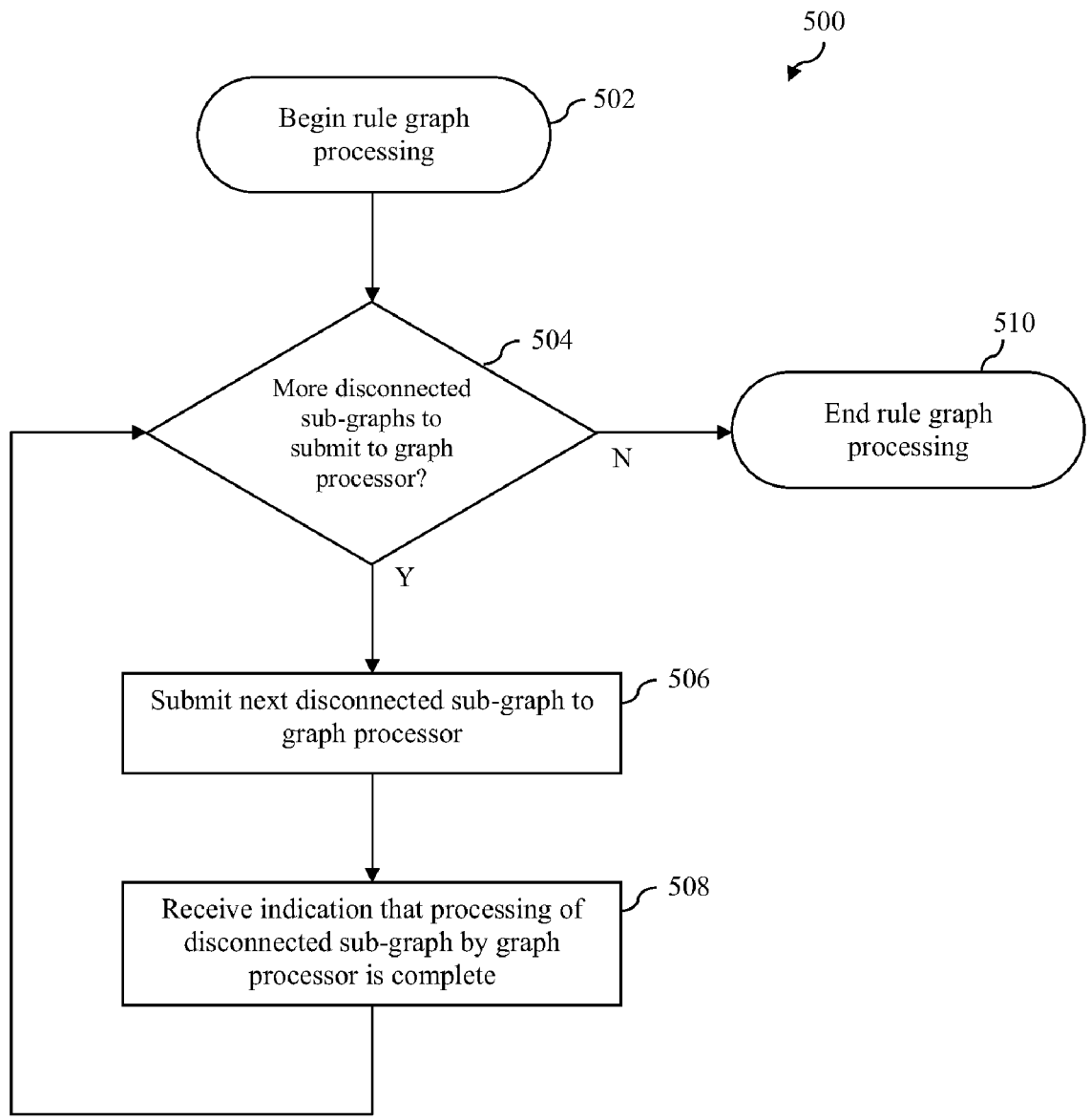
FIGS. 5 and 6 depict flowcharts of a method by which a policy processor may process a rule graph in accordance with an embodiment of the present invention.
Figure 6:
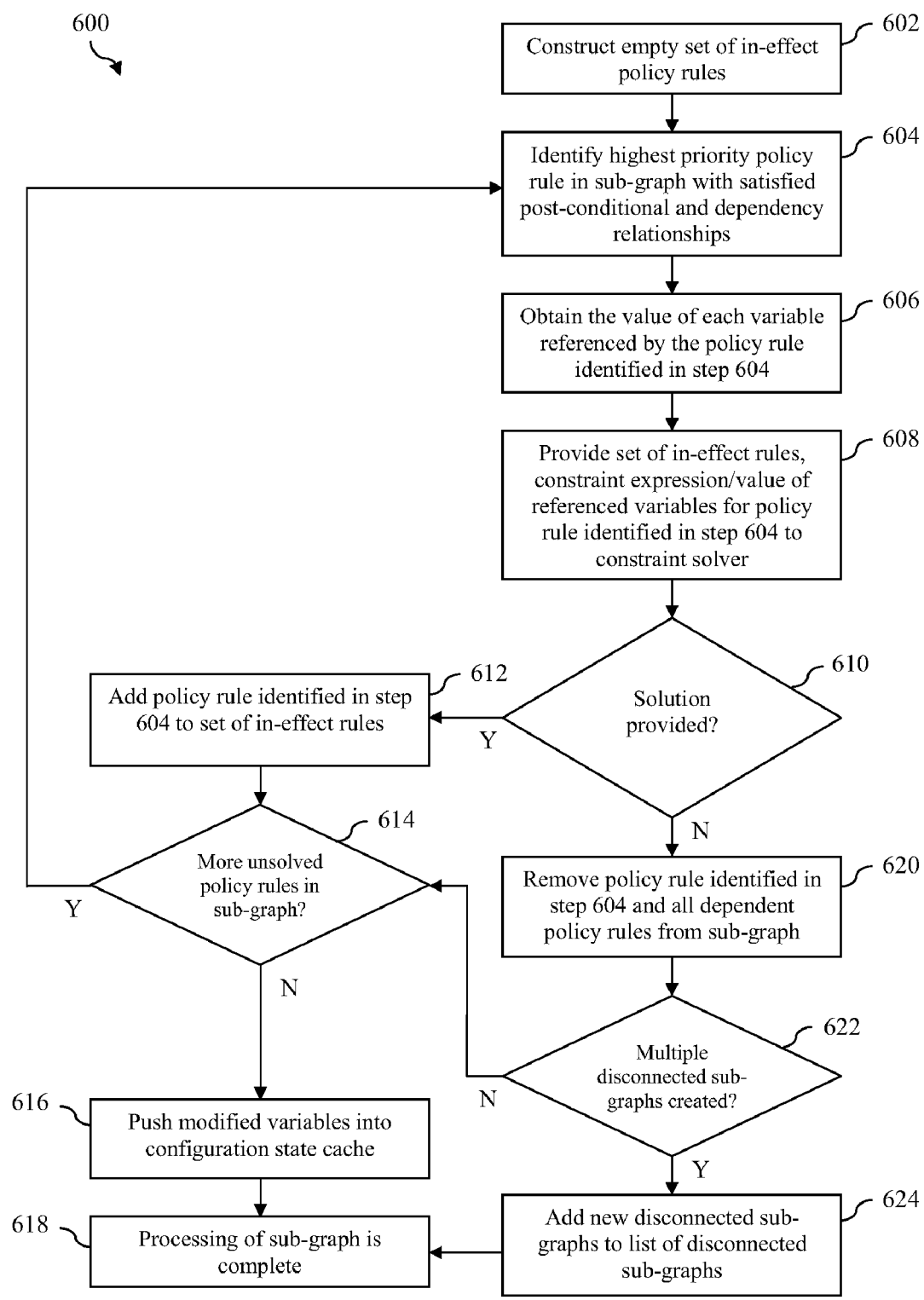

FIGS. 5 and 6 depict respective flowcharts 500 and 600 of an example method by which rule processor 218 and graph processor 222 may operate to process a rule graph in accordance with an embodiment of the present invention. The beginning of the example method is indicated at step 502 of flowchart 500. At decision step 504, rule processing logic 220 within rule processor 218 determines whether there are any more disconnected sub-graphs within the rule graph that have not yet been processed. If there are no more disconnected sub-graphs to process, then the method of flowchart 500 ends as shown at step 510.

However, if there are more disconnected sub-graphs within the rule graph that have not yet been processed, then rule processing logic 220 submits a disconnected sub-graph that has not yet been processed to graph processor 222 for processing as shown at step 506. At step 508, rule processing logic 220 receives an indication from graph processor 222 that the processing of the disconnected sub-graph submitted during step 506 has completed. Responsive to receiving this indication, rule processing logic 220 again performs decision step 504.

Since disconnected sub-graphs may be processed independently from other disconnected sub-graphs, any suitable ordering scheme may be used in step 506 for submitting sub-graphs to graph processor 222. Furthermore, since disconnected sub-graphs may be processed independently from other disconnected sub-graphs, an alternate embodiment of the present invention may provide multiple instances of graph processor 222 for processing multiple disconnected sub-graphs concurrently.

Flowchart 600 of FIG. 6 shows steps performed by graph processor 222 after a disconnected sub-graph has been submitted thereto in accordance with step 506 of flowchart 500. As shown in FIG. 6, the process of flowchart 600 begins at step 602, during which graph processing logic 224 within graph processor 602 constructs an empty set of in-effect policy rules. Policy rules added to this set may be thought of as contributing to a solution of the disconnected sub-graph that is currently being processed by graph processor 222.

At step 604, graph processing logic 224 identifies a highest priority policy rule in the disconnected sub-graph that has satisfied post-conditional and dependency relationships. A post-conditional relationship is deemed satisfied if the policy rule identified by the post-conditional relationship has already been determined to be in-effect or not-in-effect. A dependency relationship is deemed satisfied if the policy rule identified by the dependency relationship has been determined to be true. If multiple priority rules in the disconnected sub-graph qualify as the highest priority policy rule having satisfied post-conditional and dependency relationships, then graph processing logic 224 will selectively identify one of the qualifying policy rules in accordance with some deterministic algorithm.

At step 606, graph processing logic 224 obtains the value of each variable referenced by the policy rule identified during step 604. The value of each variable may be obtained by accessing configuration points associated with the variable that are stored in a local cache by document processing logic 216. If the required information is not stored in the local cache, or if the information stored in the local cache is not sufficiently current, then the required information may be obtained by placing a call to an appropriate state provider (such as any of state providers $120_{1\text{-}n}$ described above in reference to FIG. 1). Information returned from the state provider may be stored in the local cache as well as forwarded to graph processing logic 224.

At step 608, graph processing logic 224 provides the current set of in-effect rules, the constraint expression of the policy rule identified in step 604, and the value of the variables referenced by the policy rule identified in step 604 to constraint solver 226.

At decision step 610, constraint solver 226 attempts to produce a solution that satisfies the constraint expression of the policy rule identified in step 604 and all of the constraint expressions associated with the submitted set of in-effect rules. Producing a solution comprises producing a solution for each mutable variable referenced by the constraint expressions. Constraint solver 226 may either produce a solution or determine that a solution is not possible. A solution may not be possible, for example, if the constraint expression of the policy rule identified in step 604 is not mutually satisifiable with respect to a constraint expression included within an in-effect policy rule in the set of in-effect policy rules. In contrast, a solution may be possible, for example, if the constraint expression of the policy rule identified in step 604 is mutually satisifiable with respect to all the constraint expressions included within the set of in-effect policy rules. Graph processing logic 224 may also determine that a solution cannot be provided if, for example, the policy rule that includes the constraint expression is part of a cycle of policy rules in the disconnected sub-graph that cannot be satisfied or if at least one variable needed to solve the constraint expression is not available.

If a solution is provided during decision step 610, then control flows to step 612, during which graph processing logic 224 adds the policy rule identified in step 604 to the set of in-effect policy rules.

After step 612, control then flows to decision step 614, in which graph processing logic 224 determines whether there are more unsolved policy rules in the disconnected sub-graph. If there are more unsolved policy rules then control returns to step 604. If there are no more unsolved policy rules, then control flows to step 616, in which any mutable variables that were modified by virtue of the solving of the set of constraints during decision step 610 are pushed into the configuration state cache managed by document processing logic 216. Processing of the sub-graph is then deemed complete as shown at step 618.

If, however, it is determined during decision step 610 that the constraint expression of the policy rule identified in step 604 cannot be solved, then control flows to step 620, during which graph processing logic 224 removes the policy rule identified in step 604 from the disconnected sub-graph as well as all policy rules that are dependent upon the policy rule identified in step 604 by virtue of a dependency relationship. In an embodiment, this step may also include removing all lower priority policy rules from the disconnected sub-graph depending upon the value of a configurable parameter associated with policy processor 200.

After step 620, control flows to decision step 622 during which graph processing logic 224 determines whether the removal of policy rules from the disconnected sub-graph during step 620 resulted in the fragmentation of the current disconnected sub-graph into multiple disconnected sub-graphs. If the disconnected sub-graph was not fragmented, then control flows to decision step 614 which has been previously described. If the disconnected sub-graph was fragmented, then control flows to step 624, during which rule processing logic 224 adds the new disconnected sub-graphs to the list of disconnected sub-graphs to be processed by graph processing logic 224. After step 624, the processing of the sub-graph is deemed complete as shown at step 618.

F. Example Sub-Graphs and Processing Thereof

In order to facilitate a further understanding of the foregoing embodiments, this section will present a description of various disconnected sub-graphs that may be created by rule processor 218 of policy processor 200 and the manner in which such sub-graphs may be processed by graph processor 222. The sub-graphs and associated processing operations described in this section are provided herein by way of example only and are not intended to be limiting.

Figure 7:
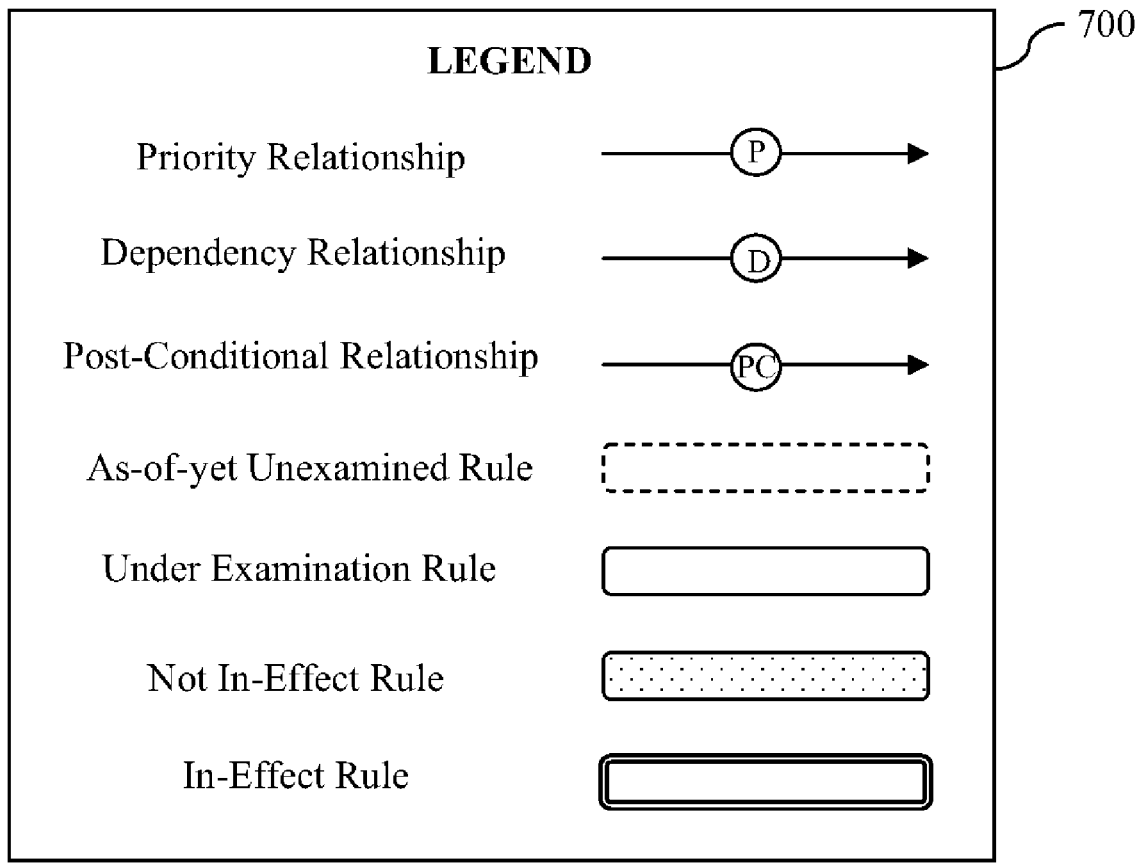
FIG. 7 depicts a legend that may be used to understand sub-graphs depicted in FIGS. 8A, 8B, 8C, 8D, 9A, 9B, 9C, 9D, 9E, 10A, 10B, 10C, 11A, 11B, 11C, 11D, 12A, 12B, 12C, 12D, 12E, 12F, 13A, 13B, 13C, 13D, 13E, 13F, 14A, 14B, 14C, 14D, 14E, 15A, 15B, 15C, 15D, 15E, 15F, 16A, 16B, 16C, 16D, 17A, 17B, 17C, 17D, 18A, 18B, 18C, 19A, 19B, 19C, 19D, 20A, 20B, 20C, 20D, 20E and 20F.

To assist in understanding the figures described in this section, FIG. 7 depicts a legend 700. As shown in legend 700, a priority relationship will be represented by a directional link labeled "P," a dependency relationship will be represented by a directional link labeled "D" and a post-conditional relationship will be represented by a directional link labeled "PC." For priority relationships, the link will point to the policy rule having the higher priority and in the case of policy rules having equal priority, each policy rule will have a link pointing to the other policy rule (thereby forming a cycle). For dependency relationships, the link will point away from the dependent policy rule. For post-conditional relationships, the link will point to the policy rule that must be processed first.

As also shown in legend 700, a rule that has not yet been examined will be represented by a box (or vertex) having dashed lines, a rule that is currently being examined will be represented by a box having solid lines, a rule that has been determined not to be in effect will be represented by a shaded box and a rule that has been determined to be in effect will be represented by a box having double lines.

For each rule shown, variables are represented with the prefix "$". Mutable variables appear underlined (e.g., $\underline{\$x}$) and primed variables appear followed by an apostrophe (e.g., $\underline{\$x'}$).

FIGS. 8A, 8B, 8C and 8D depict the processing of a sub-graph 800 in which a priority relationship exists between a policy rule 802 and a policy rule 804. FIG. 8A shows sub-graph 800 prior to processing. FIG. 8B shows that policy rule 802 is examined first because it has a higher priority than policy rule 804. Because the constraint expression in policy rule 802 cannot possibly be satisfied, policy rule 802 is deemed to be not in effect as shown in FIG. 8C. The constraint expression in policy rule 804 is then examined as also shown in FIG. 8C. Since the constraint expression in policy rule 804 can be satisfied, policy rule 804 is deemed to be in effect as shown in FIG. 8D. The example of FIGS. 8A, 8B, 8C and 8D thus demonstrates that infeasibility is not propagated down priority relationships.

FIGS. 9A, 9B, 9C, 9D and 9E depict the processing of a sub-graph 900 that includes a first priority relationship between a policy rule 902 and a policy rule 904 and a second priority relationship between policy rule 904 and a policy rule 906. FIG. 9A shows sub-graph 900 prior to processing. FIG. 9B shows that policy rule 902 is examined first because it has a higher priority than policy rule 904 and policy rule 906. Since the constraint expression in policy rule 902 can be satisfied, policy rule 902 is deemed to be in effect as shown in FIG. 9C. As also shown in FIG. 9C, the constraint expression in policy rule 904 is then examined because policy rule 904 has a higher priority than policy rule 906. Since the constraint expression in policy rule 904 cannot be reconciled with the constraint expression of in-effect policy rule 902, policy rule 904 is deemed not to be in effect as shown in FIG. 9D. As also shown in FIG. 9D, since infeasibility is not propagated down priority relationships, the constraint expression in policy rule 906 is then examined. Since the constraint expression in policy rule 906 can be satisfied without conflicting with in-effect policy rule 902, policy rule 906 is deemed to be in effect as shown in FIG. 9E.

FIGS. 10A, 10B and 10C depict the processing of a sub-graph 1000 that includes a first dependency relationship between a policy rule 1002 and a policy rule 1004 and a second dependency relationship between policy rule 1004 and a policy rule 1006. FIG. 10A shows sub-graph 1000 prior to processing. FIG. 10B shows that policy rule 1002 is examined first because it does not depend from any unexamined or not-in-effect policy rules. It is assumed for the purpose of this example that the constraint expression in policy rule 1002 cannot be satisfied because the value of primed non-mutable variable $x'$ is not greater than 100. Consequently, policy rule 1002 is deemed not to be in effect as shown in FIG. 10C. As also shown in FIG. 10C, since policy rule 1002 is not in effect, policy rule 1004 that depends from policy rule 1002 is also deemed not to be in effect and policy rule 1006 that depends from policy rule 1004 is also deemed not to be in effect. The example of FIGS. 10A, 10B and 10C thus demonstrates that infeasibility is propagated down dependency relationships.

FIGS. 11A, 11B, 11C and 11D depict the processing of a sub-graph 1100 that includes a first dependency relationship between a policy rule 1102 and a policy rule 1104 and a second dependency relationship between policy rule 1104 and a policy rule 1106. FIG. 11A shows sub-graph 1100 prior to processing. FIG. 11B shows that policy rule 1102 is examined first because it does not depend from any unexamined or not-in-effect policy rules. It is assumed for the purpose of this example that the constraint expression in policy rule 1102 is satisfied because the value of primed non-mutable variable $x'$ is greater than 100. Consequently, policy rule 1102 is deemed to be in effect as shown in FIG. 11C. As also shown in FIG. 10C, since policy rule 1104 is now the only unexamined policy rule that does not depend from any unexamined or not-in-effect policy rules, it is examined next. It is assumed for the purpose of this example that the constraint expression in policy rule 1104 cannot be satisfied because the value of primed non-mutable variable $y'$ is not equal to 50. Consequently, policy rule 1104 is deemed not to be in effect as shown in FIG. 11D. As also shown in FIG. 11D, since policy rule 1104 is not in effect, policy rule 1106 that depends from policy rule 1104 is also deemed not to be in effect since infeasibility is propagated down dependency relationships.

FIGS. 12A, 12B, 12C, 12D, 12E and 12F depict the processing of a sub-graph 1200 that includes a priority relationship between a policy rule 1202 and a policy rule 1204, a first post-conditional relationship between policy rule 1202 and a policy rule 1206, a second post-conditional relationship between policy rule 1204 and policy rule 1206, and a dependency relationship between policy rule 1206 and a policy rule 1208.

FIG. 12A shows sub-graph 1200 prior to processing. FIG. 12B shows that policy rule 1202 is examined first because it is the highest priority policy rule that does not require the resolution of another policy rule in accordance with a post-conditional relationship and that does not depend from any unexamined or not-in-effect policy rules. Since the constraint expression in policy rule 1202 can be satisfied, policy rule 1202 is deemed to be in effect as shown in FIG. 12C. As also shown in FIG. 12C, policy rule 1204 is examined next because it is now the highest priority unexamined policy rule that does not require the resolution of another policy rule in accordance with a post-conditional relationship and that does not depend from any unexamined or non-in-effect policy rules. Since the constraint expression in policy rule 1204 can be satisfied without conflicting with in-effect policy rule 1202, policy rule 1204 is deemed to be in effect as shown in FIG. 12D. As also shown in FIG. 12D, policy rule 1206 is now examined since it is the only unexamined policy rule that does not depend from any unexamined or not-in-effect policy rules. The constraint expression in policy rule 1206 is satisfied since policy rules 1202 and 1204 that express a constraint over the value of variable $x'$ have resulted in a satisfactory choice (i.e., $x'=51$). Consequently, policy rule 1206 is deemed to be in effect as shown in FIG. 12E. As also shown in FIG. 12E, policy rule 1208 is now examined. Since policy rule 1208 can be satisfied without conflicting with in-effect policy rules 1202, 1204 and 1206, policy rule 1208 is deemed to be in effect as shown at FIG. 12F. As shown by the foregoing, the post-conditional relationships in sub-graph 1200 introduced an ordering constraint that was required to determine if the constraint expression of policy rule 1206 could be satisfied.

FIGS. 13A, 13B, 13C, 13D, 13E and 13F depict the processing of a sub-graph 1300 that includes a priority relationship between a policy rule 1302 and a policy rule 1304, a first post-conditional relationship between policy rule 1302 and a policy rule 1306, a second post-conditional relationship between policy rule 1304 and policy rule 1306, and a dependency relationship between policy rule 1306 and a policy rule 1308.

FIG. 13A shows sub-graph 1300 prior to processing. FIG. 13B shows that policy rule 1302 is examined first because it is the highest priority policy rule that does not require the resolution of another policy rule in accordance with a post-conditional relationship and that does not depend from any unexamined or not-in-effect policy rules. Since the constraint expression in policy rule 1302 can be satisfied, policy rule 1302 is deemed to be in effect as shown in FIG. 13C. As also shown in FIG. 13C, policy rule 1304 is examined next because it is now the highest priority unexamined policy rule that does not require the resolution of another policy rule in accordance with a post-conditional relationship and that does not depend from any unexamined or non-in-effect policy rules. Since the constraint expression in policy rule 1304 cannot be satisfied without conflicting with in-effect policy rule 1302, policy rule 1304 is deemed not to be in effect as shown in FIG. 13D. As also shown in FIG. 13D, policy rule 1306 is now examined since it is the only unexamined policy rule that does not depend from any unexamined or not-in-effect policy rules. The constraint expression in policy rule 1306 is satisfied since the conflict between policy rules 1302 and 1304 has been resolved in a manner that satisfies the post-conditional assertion (i.e., $x'>50$). Consequently, policy rule 1306 is deemed to be in effect as shown in FIG. 13E. As also shown in FIG. 13E, policy rule 1308 is now examined. Since policy rule 1308 can be satisfied without conflicting with in-effect policy rules 1302 and 1306, policy rule 1308 is deemed to be in effect as shown at FIG. 13F. As shown by the foregoing, infeasibility is not propagated down post-conditional relationships.

FIGS. 14A, 14B, 14C, 14D and 14E depict the processing of a sub-graph 1400 that includes a priority relationship between a policy rule 1402 and a policy rule 1404, a first post-conditional relationship between policy rule 1402 and a policy rule 1406, a second post-conditional relationship between policy rule 1404 and policy rule 1406, and a dependency relationship between policy rule 1406 and a policy rule 1408.

FIG. 14A shows sub-graph 1400 prior to processing. FIG. 14B shows that policy rule 1402 is examined first because it is the highest priority policy rule that does not require the resolution of another policy rule in accordance with a post-conditional relationship and that does not depend from any unexamined or not-in-effect policy rules. Since the constraint expression in policy rule 1402 can be satisfied, policy rule 1402 is deemed to be in effect as shown in FIG. 14C. As also shown in FIG. 14C, policy rule 1404 is examined next because it is now the highest priority unexamined policy rule that does not require the resolution of another policy rule in accordance with a post-conditional relationship and that does not depend from any unexamined or non-in-effect policy rules. Since the constraint expression in policy rule 1404 cannot be satisfied without conflicting with in-effect policy rule 1402, policy rule 1404 is deemed not to be in effect as shown in FIG. 14D. As also shown in FIG. 14D, policy rule 1406 is now examined since it is the only unexamined policy rule that does not depend from any unexamined or not-in-effect policy rules. The constraint expression in policy rule 1406 is not satisfied since the conflict between policy rules 1402 and 1404 has not been resolved in a manner that satisfies the post-conditional assertion (i.e., $x'>50$). Consequently, policy rule 1406 is deemed not to be in effect as shown in FIG. 14E. As also shown in FIG. 14E, since policy rule 1406 is not in effect, policy rule 1408 that depends therefrom is also deemed not to be in effect. As shown by the foregoing, while infeasibility is not propagated down post-conditional relationships, order and priority may sufficiently limit a solution space such that infeasibility is reached due to a post-conditional relationship.

FIGS. 15A, 15B, 15C, 15D, 15E and 15F depict the processing of a sub-graph 1500 that includes a priority relationship between a policy rule 1502 and a policy rule 1504, a first post-conditional relationship between policy rule 1502 and a policy rule 1506, a second post-conditional relationship between policy rule 1504 and policy rule 1506, and a dependency relationship between policy rule 1506 and a policy rule 1508.

FIG. 15A shows sub-graph 1500 prior to processing. FIG. 15B shows that policy rule 1502 is examined first because it is the highest priority policy rule that does not require the resolution of another policy rule in accordance with a post-conditional relationship and that does not depend from any unexamined or not-in-effect policy rules. Since the constraint expression in policy rule 1502 cannot possibly be satisfied, policy rule 1502 is deemed not to be in effect as shown in FIG. 15C. As also shown in FIG. 15C, policy rule 1504 is examined next because it is now the highest priority unexamined policy rule that does not require the resolution of another policy rule in accordance with a post-conditional relationship and that does not depend from any unexamined or non-in-effect policy rules. Since the constraint expression in policy rule 1504 also cannot possibly be satisfied, policy rule 1504 is deemed not to be in effect as shown in FIG. 15D. As also shown in FIG. 15D, policy rule 1506 is now examined since it is the only unexamined policy rule that does not depend from any unexamined or not-in-effect policy rules. The constraint expression in policy rule 1506 is satisfied due to an assumed state value of $x'$ that satisfies the post-conditional assertion (i.e., $x'<1000$) given that there has been no valid expression of mutable intent over $x'$. Consequently, policy rule 1506 is deemed to be in effect as shown in FIG. 15E. As also shown in FIG. 15E, policy rule 1508 is now examined. Since policy rule 1508 can be satisfied without conflicting with in-effect policy rule 1506, policy rule 1508 is deemed to be in effect as shown at FIG. 15F.

FIGS. 16A, 16B, 16C and 16D depict the processing of a sub-graph 1600 that includes a cycle formed by a first priority relationship between a policy rule 1602 and a policy rule 1604, a first dependency relationship between policy rule 1604 and a policy rule 1606, and a second dependency relationship between policy rule 1606 and policy rule 1602. Sub-graph 1600 also includes a second priority relationship between policy rule 1606 and a policy rule 1608. FIG. 16A shows sub-graph 1600 prior to processing. FIG. 16B shows that policy rules 1602, 1604 and 1606 must all be examined at the same time to determine if the cycle can be satisfied. In this case, the cycle can be satisfied. Accordingly, policy rules 1602, 1604 and 1606 are deemed to be in effect as shown in FIG. 16C. As also shown in FIG. 16C, since policy rule 1606 is deemed to be in effect, policy rule 1608 that depends therefrom can be examined. Since the constraint expression in policy rule 1608 can be satisfied in a manner that does not conflict with in-effect policy rules 1602, 1604 and 1606, it is deemed to be in effect as shown in FIG. 16D.

FIGS. 17A, 17B, 17C and 17D depict the processing of a sub-graph 1700 that includes a cycle formed by a first priority relationship between a policy rule 1702 and a policy rule 1704, a first dependency relationship between policy rule 1704 and a policy rule 1706, and a second dependency relationship between policy rule 1706 and policy rule 1702. Sub-graph 1700 also includes a second priority relationship between policy rule 1706 and a policy rule 1708. FIG. 17A shows sub-graph 1700 prior to processing. FIG. 17B shows that policy rules 1702, 1704 and 1706 must all be examined at the same time to determine if the cycle can be satisfied. In this case, the cycle cannot be satisfied because of the conflicting constraint expressions in policy rules 1702 and 1704. Accordingly, policy rules 1702, 1704 and 1706 are all deemed not to be in effect as shown in FIG. 17C. As also shown in FIG. 17C, policy rule 1708 is examined next since infeasibility does not propagate down priority relationships. Since the constraint expression in policy rule 1708 can be satisfied, policy rule 1708 is deemed to be in effect as shown in FIG. 17D.

FIGS. 18A, 18B and 18C depict the processing of a sub-graph 1800 that includes a cycle formed by a priority relationship between a policy rule 1802 and a policy rule 1804, a first dependency relationship between policy rule 1804 and a policy rule 1806, and a second dependency relationship between policy rule 1806 and policy rule 1802. Sub-graph 1800 also includes a third dependency relationship between policy rule 1806 and a policy rule 1808. FIG. 18A shows sub-graph 1800 prior to processing. FIG. 18B shows that policy rules 1802, 1804 and 1806 must all be examined at the same time to determine if the cycle can be satisfied. In this case, the cycle cannot be satisfied because of the conflicting constraint expressions in policy rules 1802 and 1804. Accordingly, policy rules 1802, 1804 and 1806 are all deemed not to be in effect as shown in FIG. 18C. As also shown in FIG. 18C, since policy rule 1808 depends from not-in-effect policy rule 1808, it is also deemed not to be in effect since infeasibility propagates down dependency relationships.

Figure 19A:
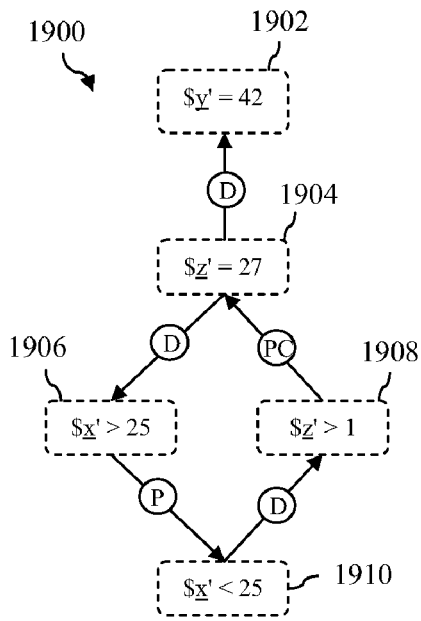
FIGS. 19A, 19B, 19C and 19D depict the processing of another sub-graph that includes a cycle in accordance with an embodiment of the present invention.
Figure 19B:
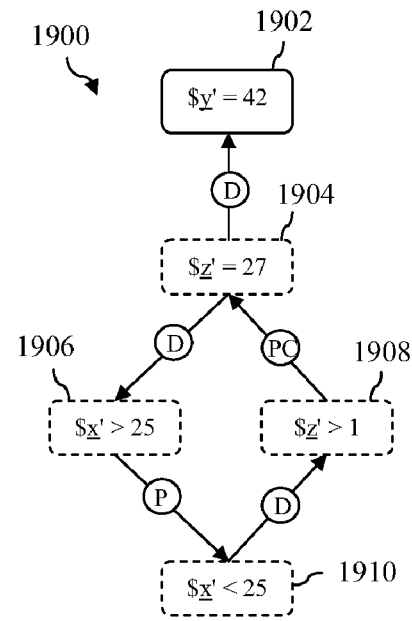
Figure 19C:
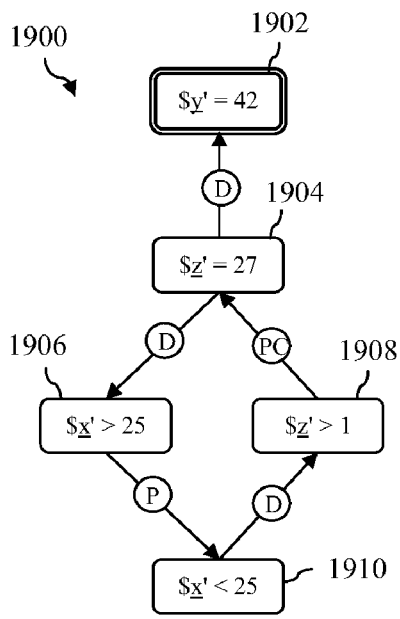
Figure 19D:
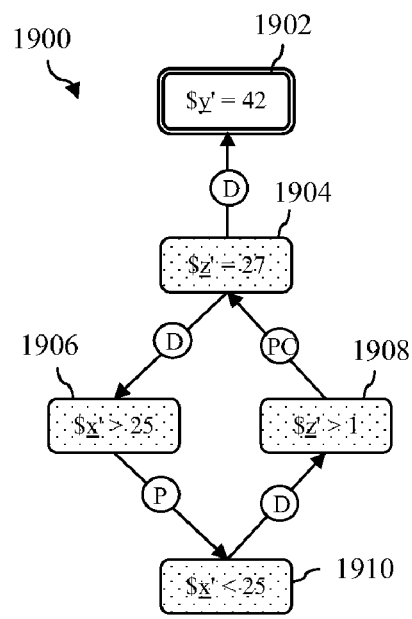

FIGS. 19A, 19B, 19C and 19C depict the processing of a sub-graph 1900 that includes a cycle formed by a post-conditional relationship between a policy rule 1904 and a policy rule 1908, a first dependency relationship between policy rule 1908 and a policy rule 1910, a priority relationship between policy rule 1910 and a policy rule 1906, and a second dependency relationship between policy rule 1906 and a policy rule 1904. Sub-graph 1900 also includes a third dependency relationship between a policy rule 1902 and policy rule 1904. FIG. 19A shows sub-graph 1900 prior to processing. FIG. 19B shows that policy rule 1902 is examined first since it is the highest priority policy rule that does not require the resolution of another policy rule in accordance with a post-conditional relationship and that does not depend from any unexamined or not-in-effect policy rules. Since the constraint expression in policy rule 1902 can be satisfied, policy rule 1902 is deemed to be in effect as shown in FIG. 19C. As also shown in FIG. 19C, since the cycle formed by the relationships between policy rules 1904, 1906, 1908 and 1910 depends from in-effect policy rule 1902, the cycle may now be examined. In this case, because the cycle includes a post-conditional relationship, it is impossible to satisfy. Thus, policy rules 1904, 1906, 1908 and 1910 are deemed not to be in effect as shown in FIG. 19D.

FIGS. 20A, 20B, 20C, 20D, 20E and 20F depict the processing of a sub-graph 2000 that includes a cycle formed by a post-conditional relationship between a policy rule 2004 and a policy rule 2008, a first dependency relationship between policy rule 2008 and a policy rule 2010, a priority relationship between policy rule 2010 and a policy rule 2006, and a second dependency relationship between policy rule 2006 and a policy rule 2004. Sub-graph 2000 also includes a third dependency relationship between a policy rule 2002 and policy rule 2004.

FIG. 20A shows sub-graph 2000 prior to processing. FIG. 20B shows that policy rule 2002 is examined first since it is the highest priority policy rule that does not require the resolution of another policy rule in accordance with a post-conditional relationship and that does not depend from any unexamined or not-in-effect policy rules. Since the constraint expression in policy rule 2002 cannot possibly be satisfied, policy rule 2002 is deemed not to be in effect as shown in FIG. 20C. As also shown in FIG. 20C, since policy rule 2002 is not in effect, policy rule 2004 that depends therefrom is also deemed not to be in effect, since infeasibility propagates down dependency relationships. This results in an independent chain constructed by the remaining policy rules in the cycle. This chain is then evaluated as it would have been if the cycle had not existed. In particular, policy rule 2008 is examined since it is the highest priority policy rule that does not depend from any unexamined or not-in-effect policy rules. Since the constraint expression in policy rule 2008 can be satisfied, policy rule 2008 is deemed to be in effect as shown in FIG. 20D. As also shown in FIG. 20D, policy rule 2010 is then examined since it is now the highest priority policy rule that does not depend from any unexamined or not-in-effect policy rules. Since the constraint expression in policy rule 2010 can be satisfied, policy rule 2010 is deemed to be in effect as shown in FIG. 20E. As also shown in FIG. 20E, policy rule 2006 is then examined. Since the constraint expression in policy rule 2006 conflicts with in-effect rule 2010, policy rule 2006 is deemed not to be in effect as shown in FIG. 20F.

G. Example Implementation that Supports Type Space Rules

An embodiment of the present invention will now be described that further supports the authoring and enactment of type space rules. As used herein, the term "type space rule" refers to a set of constraints that must be satisfied by any valid instance of a given policy rule type, in which case the set of constraints may be referred to as type constraints. The term "type space rule" may also refer to a set of constraints specified over a specific instance of a type, in which case the set of constraints may be referred to as instance constraints. Type space rules are evaluated alongside all other policy rules over a given configuration state variable and are defined to have a higher priority than policy rules. Type space rules may include simple constraints such as contiguous domain bounds, but may also include more complex constraints.

In order to support the authoring and enactment of type space rules, an embodiment of the present invention supports the authoring of rules that include conditionally mutable variables. As will be described in more detail below, the condition upon which the mutability of the variable depends is implicitly the appearance of the variable as mutable in some other policy rule. It is noted that type space rules represent only one use of rules that contain conditionally mutable references, and that other uses of such rules are contemplated by this disclosure.

To further support the authoring and enactment of type space rules, rule processing logic 220 within rule processor 218 is configured to create a new type of link or edge when generating a rule graph, which may be referred to as a conditional-mutability link. The additional steps performed by rule processing logic 220 to perform this function are depicted in flowchart 2100 of FIG. 21. In an embodiment, rule processing logic 220 performs the steps of flowchart 2100 in addition to the steps of flowchart 400 described above in reference to FIG. 4 when generating a rule graph.

Figure 21:
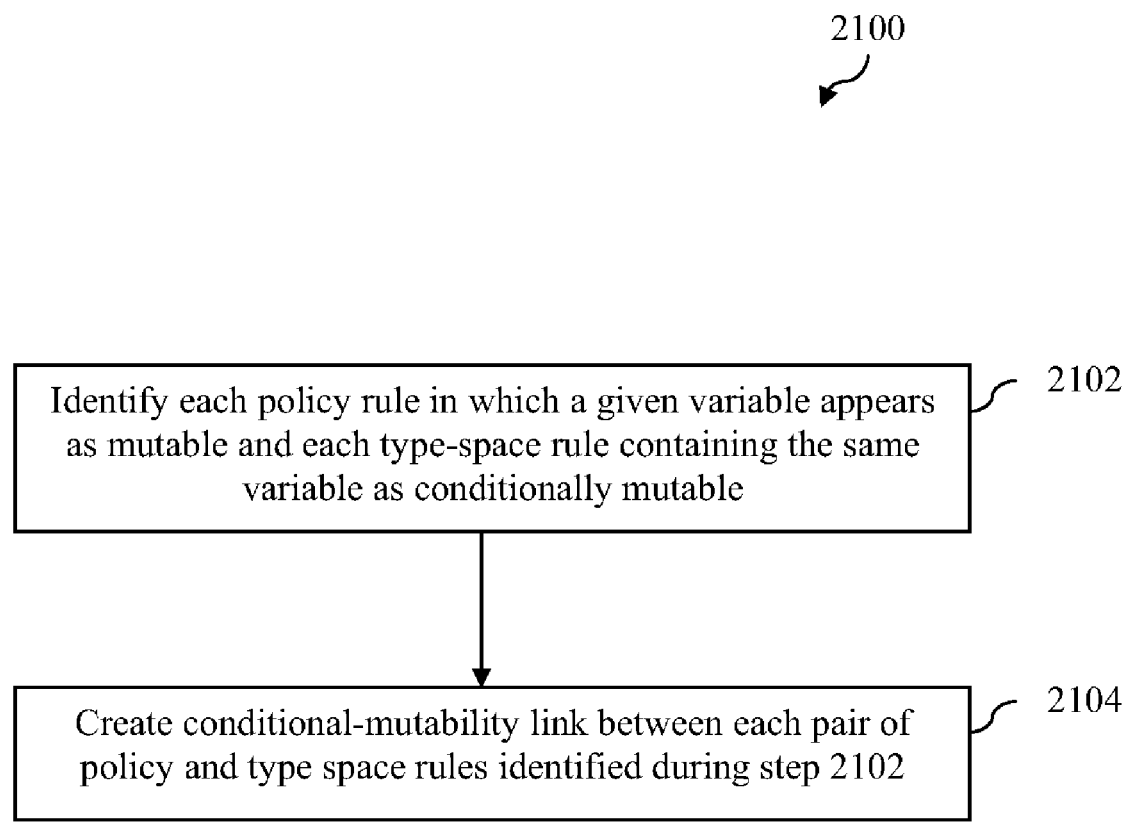
FIG. 21 depicts a flowchart of a method by which a policy processor may construct a rule graph that includes conditional-mutability links in accordance with an embodiment of the present invention that supports the authoring and enactment of type space rules.

As shown in FIG. 21, the method of flowchart 2100 begins at step 2102 in which rule processing logic 220 identifies each policy rule in the set of policy rules received from document processing logic 220 in which a given variable appears as mutable and each type space rule that contains the same variable as conditionally mutable. At step 2104, rule processing logic 220 creates a conditional-mutability link between each pair of policy and type space rules identified during step 2102. For a given variable x that appears conditionally mutable in a type space rule, the execution of step 2104 will have the effect of creating a conditional-mutability link with context x between all nodes representing policy rules in which the variable x appears as mutable and the node representing the type space rule containing x as conditionally mutable. Depending upon the implementation, the conditional-mutability link may be represented as undirected or, alternately, as a directed cycle between two nodes.

Figure 22:
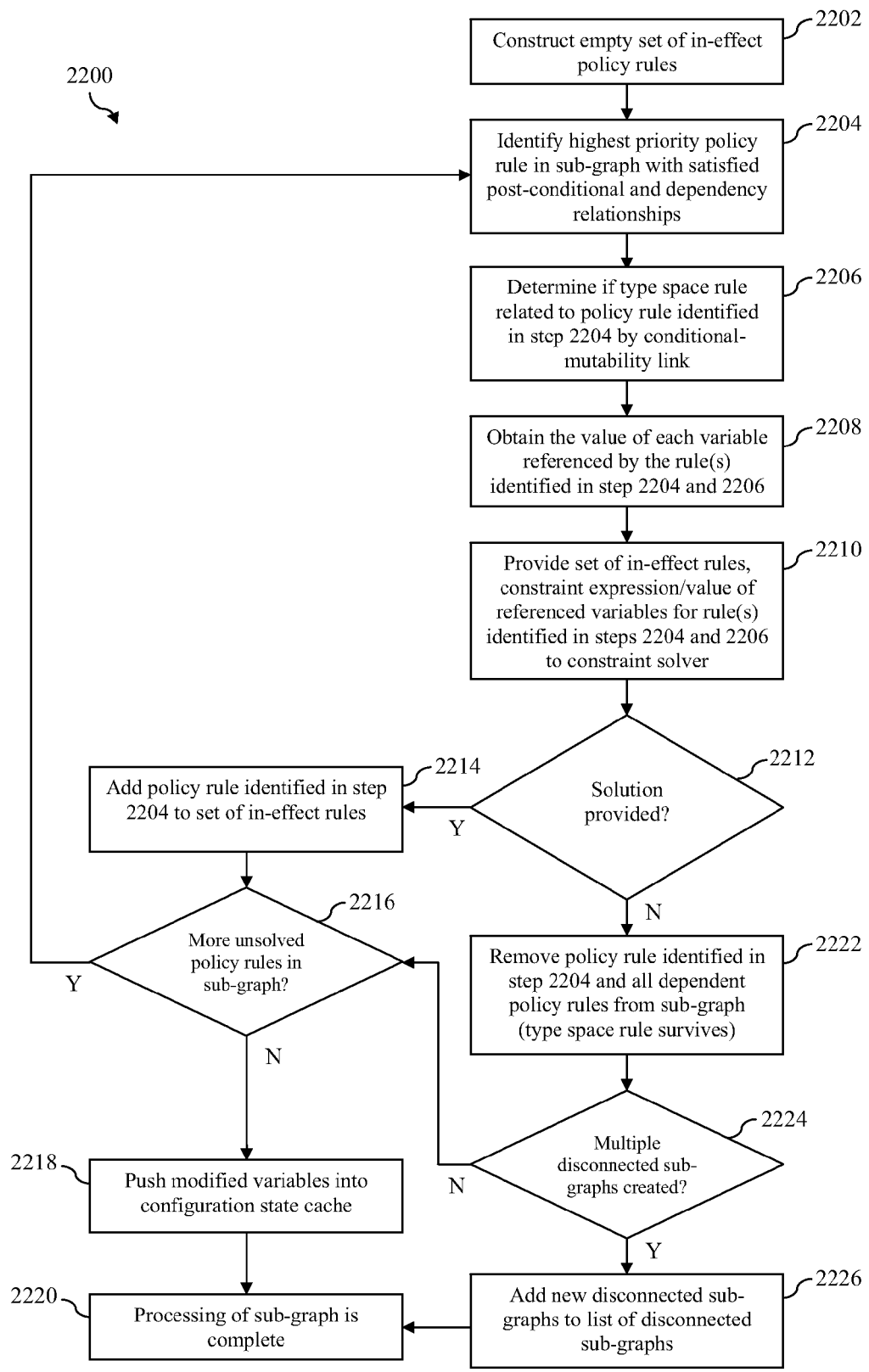
FIG. 22 depicts a flowchart of a method by which a policy processor may process a rule graph in accordance with an embodiment of the present invention that supports the authoring and enactment of type space rules.

FIG. 22 depicts a flowchart 2100 of a method performed by graph processor 222 after a disconnected sub-graph has been submitted thereto in an embodiment of the present invention that supports the authoring and enactment of type space rules. Flowchart 2100 is essentially a modified version of flowchart 600 described above in reference to FIG. 6. Thus, details concerning the performance of certain steps that were also described above in reference to flowchart 600 will not be repeated here for the sake of brevity.

As shown in FIG. 22, the process of flowchart 2200 begins at step 2202, during which graph processing logic 224 within graph processor 602 constructs an empty set of in-effect policy rules.

At step 2204, graph processing logic 224 identifies a highest priority policy rule in the disconnected sub-graph that has satisfied post-conditional and dependency relationships.

At step 2206, graph processing logic 224 determines whether a type space rule is related to the policy rule identified in step 2204 or to any of the rules in the current set of in-effect rules by a conditional-mutability link.

At step 2208, graph processing logic 224 obtains the value of each variable referenced by the policy rule identified during step 2204 and any type space rule identified during step 2206.

At step 2210, graph processing logic 224 provides the current set of in-effect rules, the constraint expressions of the rule(s) identified in steps 2204 and 2206, and the value of the variables referenced by the rule(s) identified in step 2204 and 2206 to constraint solver 226.

If a type space rule was not identified during step 2206, then, at decision step 2212, constraint solver 226 attempts to produce a solution that satisfies the constraint expression of the policy rule identified in step 2204 and all of the constraint expressions associated with the submitted set of in-effect rules.

If a type space rule was identified during step 2206, then, at decision step 2212, constraint solver 226 attempts to produce a solution that satisfies the constraint expression of the policy rule identified in step 2204, the constraint expression of the type space rule(s) identified in step 2206, and all of the constraint expressions associated with the submitted set of in-effect rules. Thus, the policy rule identified in step 2204 and the type space rule(s) identified in step 2206 are evaluated atomically to produce a solution. To perform this function, constraint solver 226 must determine whether the policy rule identified in step 2204 includes a mutable variable that is also referenced as conditionally mutable by a type space rule identified during step 2206. If the policy rule identified in step 2204 includes a mutable variable that is also referenced as conditionally mutable by a type space rule identified during step 2206, then the conditionally mutable variable referenced by the type space rule is treated as mutable for the purposes of producing a solution. However, if the policy rule identified in step 2204 does not include a mutable variable that is also referenced as conditionally mutable by a type space rule identified during step 2206, then any conditionally mutable variable referenced by a type space rule identified during step 2206 must be treated as non-mutable for the purposes of producing a solution.

Constraint solver 226 may either produce a solution or determine that a solution is not possible. If a solution is provided during decision step 2212, then control flows to step 2214, during which graph processing logic 224 adds the policy rule identified in step 2204 to the set of in-effect policy rules. Furthermore, graph processing logic 224 adds any type space rule(s) identified during step 2206 that were not already in-effect to the set of in-effect policy rules.

After step 2214, control then flows to decision step 2216, in which graph processing logic 224 determines whether there are more unsolved policy rules in the disconnected sub-graph. If there are more unsolved policy rules then control returns to step 2204. If there are no more unsolved policy rules, then control flows to step 2218, in which any mutable variables that were modified by virtue of the solving of the set of constraints during decision step 2212 are pushed into the configuration state cache managed by document processing logic 216. Processing of the sub-graph is then deemed complete as shown at step 2220.

If, however, it is determined during decision step 2212 that a solution cannot be produced, then control flows to step 2222, during which graph processing logic 224 removes the policy rule identified in step 2204 from the disconnected sub-graph as well as all policy rules that have are dependent upon that rule by virtue of a dependency relationship. However, any type space rule identified during step 2206 will survive.

After step 2222, control flows to decision step 2224 during which graph processing logic 224 determines whether the removal of policy rules from the disconnected sub-graph during step 2226 resulted in the fragmentation of the current disconnected sub-graph into multiple disconnected sub-graphs. If the disconnected sub-graph was not fragmented, then control flows to decision step 2216 which has been previously described. If the disconnected sub-graph was fragmented, then control flows to step 2226, during which rule processing logic 224 adds the new disconnected sub-graphs to the list of disconnected sub-graphs to be processed by graph processing logic 224. After step 2226, the processing of the sub-graph is deemed complete as shown at step 2220.

In order to facilitate a further understanding of the foregoing embodiment, a description will now be provided of an example disconnected sub-graph that includes conditional-mutability links and the manner in which such a sub-graph may be processed by graph processor 222. The disconnected sub-graph will be described using the same key provided in legend 700, with the addition of conditional-mutability relationships. Conditional-mutability relationships will be represented by a cycle of directional links labeled "C."

Figure 23A:
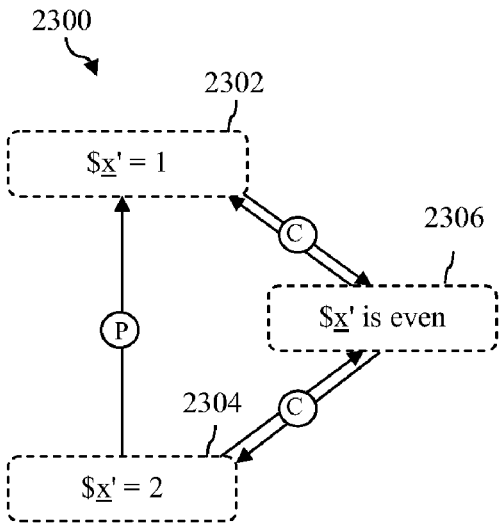
FIGS. 23A, 23B, 23C and 23D depict the processing of a sub-graph that includes conditional-mutability links in accordance with an embodiment of the present invention.
Figure 23B:
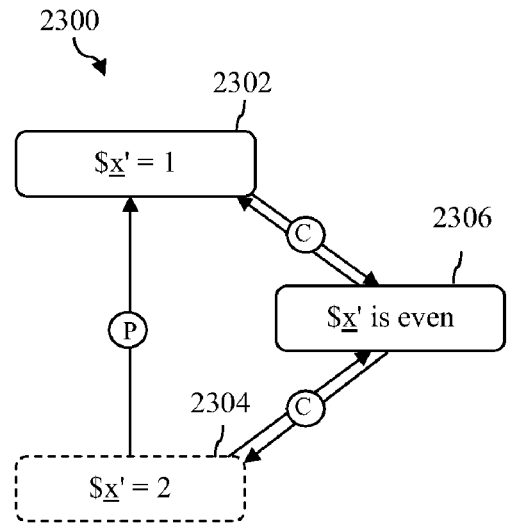
Figure 23C:
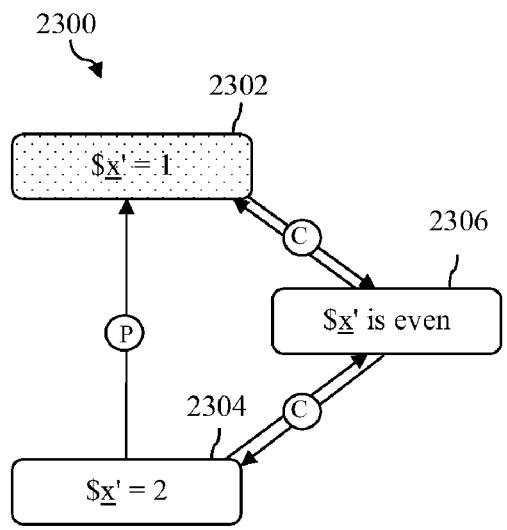

In particular, FIGS. 23A, 23B, 23C and 23D depict the processing of a sub-graph 2300 in which a priority relationship exists between a policy rule 2302 and a policy rule 2304 and a conditional-mutability relationship exists between each of policy rules 2302 and 2304 and a type space rule 2306. FIG. 23A shows sub-graph 2300 prior to processing. FIG. 23B shows that policy rule 2302 is examined first because it has a higher priority than policy rule 2304. However, because of the conditional-mutability relationship, policy rule 2302 is evaluated atomically along with type space rule 2306. The conditionally mutable variable x' in type space rule 2306 is treated as mutable because policy rule 2302 also treats that variable as mutable. Nevertheless, a solution cannot be found that will satisfy both policy rule 2302 and 2306. Thus, policy rule 2302 is deemed not to be in effect as shown in FIG. 23C. However, type space rule 2306 survives.

Figure 23D:
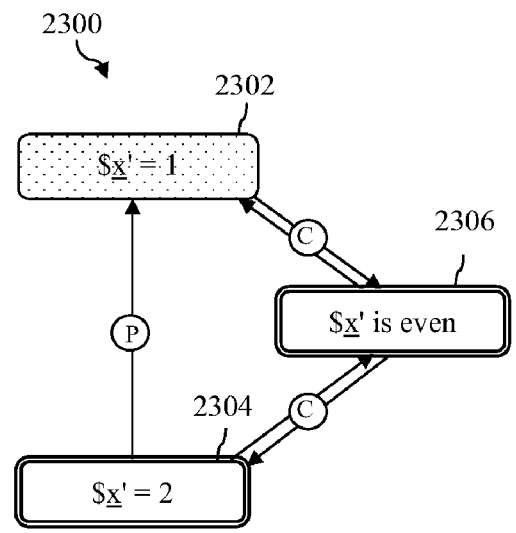

As further shown in FIG. 23C, policy rule 2304 is now evaluated. Because of the conditional-mutability relationship, policy rule 2304 is also evaluated atomically along with type space rule 2306. The conditionally mutable variable x' in type space rule 2306 is treated as mutable because policy rule 2304 also treats that variable as mutable. Here, a solution can be found that will satisfy both policy rule 2302 and type space rule 2306 (namely, $\$x'=2$). Thus, policy rule 2304 and type space rule 2306 are both deemed to be in effect as shown in FIG. 23D.

H. Example Computer System Implementation

Figure 24:
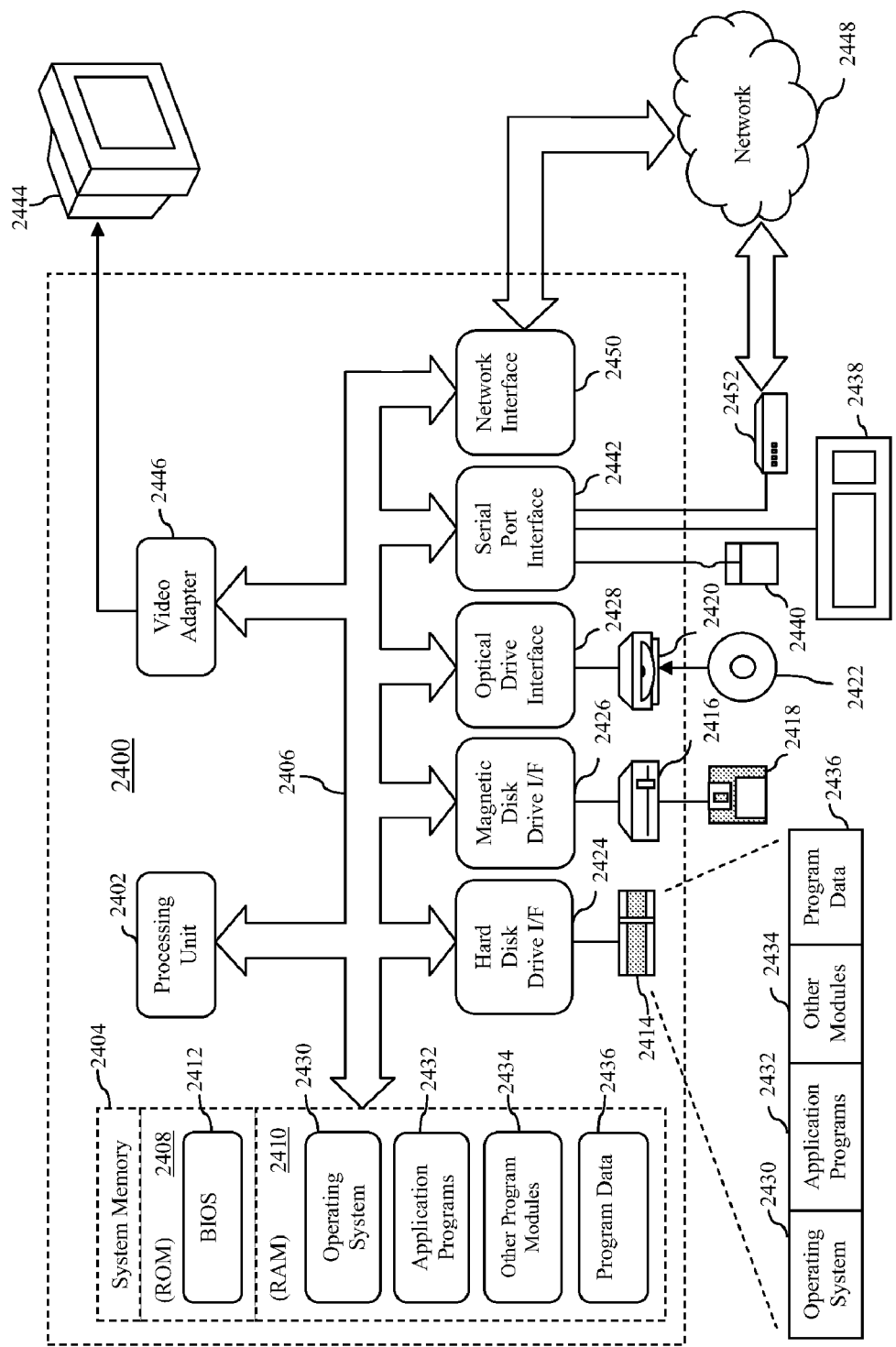
FIG. 24 depicts an example processor-based computer system that may be used to implement various aspects of the present invention.

FIG. 24 depicts an exemplary implementation of a computer system 2400 upon which various aspects of the present invention may be executed. Computer system 2400 is intended to represent a general-purpose computing system in the form of a conventional personal computer. Computer system 2400 may be used to implement, for example, managed node 108 or any of enterprise policy authorities 102, 104 or 106 as described above in reference to FIG. 1. However, this example is not intended to be limiting and a variety of processor-based systems/devices may be used to implement these entities.

As shown in FIG. 24, computer system 2400 includes a processing unit 2402, a system memory 2404, and a bus 2406 that couples various system components including system memory 2404 to processing unit 2402. Bus 2406 represents one or more of any of several types of bus structures, including a memory bus or memory controller, a peripheral bus, an accelerated graphics port, and a processor or local bus using any of a variety of bus architectures. System memory 2404 includes read only memory (ROM) 2408 and random access memory (RAM) 2410. A basic input/output system 2412 (BIOS) is stored in ROM 2408.

Computer system 2400 also has one or more of the following drives: a hard disk drive 2414 for reading from and writing to a hard disk, a magnetic disk drive 2416 for reading from or writing to a removable magnetic disk 2418, and an optical disk drive 2420 for reading from or writing to a removable optical disk 2422 such as a CD ROM, DVD ROM, or other optical media. Hard disk drive 2414, magnetic disk drive 2416, and optical disk drive 2420 are connected to bus 2406 by a hard disk drive interface 2424, a magnetic disk drive interface 2426, and an optical drive interface 2428, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2430, one or more application programs 2432, other program modules 2434, and program data 2436. Application programs 2432 or program modules 2434 may include, for example, logic for implementing any or all of the elements of managed node 108 as described above in reference to FIG. 1 or policy processor 200 as described above in reference to FIG. 2. Application programs 2432 or program modules 2434 may also include, for example, logic for implementing one or more of the steps of the flowcharts depicted in FIGS. 3-6, 21 and 22. Thus each step illustrated in those figures may also be thought of as program logic configured to perform the function described by that step.

A user may enter commands and information into computer 2400 through input devices such as keyboard 2438 and pointing device 2440. Other input devices (not shown) may include a microphone, joystick, game pad, satellite dish, scanner, or the like. These and other input devices are often connected to the processing unit 2402 through a serial port interface 2442 that is coupled to bus 2406, but may be connected by other interfaces, such as a parallel port, game port, or a universal serial bus (USB).

A monitor 2444 or other type of display device is also connected to bus 2406 via an interface, such as a video adapter 2446. Monitor 2444 is used to present a GUI that assists a user/operator in configuring and controlling computer 2400. In addition to the monitor, computer 2400 may include other peripheral output devices (not shown) such as speakers and printers.

Computer 2400 is connected to a network 2448 (e.g., a WAN such as the Internet or a LAN) through a network interface 2450, a modem 2452, or other means for establishing communications over the network. Modem 2452, which may be internal or external, is connected to bus 2406 via serial port interface 2442.

As used herein, the terms "computer program medium" and "computer-readable medium" are used to generally refer to media such as the hard disk associated with hard disk drive 2414, removable magnetic disk 2418, removable optical disk 2422, as well as other media such as flash memory cards, digital video disks, random access memories (RAMs), read only memories (ROM), and the like.

As noted above, computer programs (including application programs 2432 and other program modules 2434) may be stored on the hard disk, magnetic disk, optical disk, ROM, or RAM. Such computer programs may also be received via network interface 2450 or serial port interface 2442. Such computer programs, when executed, enable computer 2400 to implement features of the present invention discussed herein. Accordingly, such computer programs represent controllers of computer 2400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

I. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for managing the configuration state of a target entity, comprising:

receiving a plurality of policy rules applicable to the target entity, wherein each policy rule includes a constraint expression that references zero or more configuration state variables associated with the target entity and a reference to a configuration state variable may comprise a mutable or non-mutable reference;

receiving a conflict resolution model;

constructing a logical directed graph of the policy rules based on at least priority relationships between the policy rules, wherein priority relationships exist between policy rules that include constraint expressions having mutable references to the same configuration state variable and wherein the relative priority of the policy rules is determined in reference to the conflict resolution model; and determining which policy rules are in effect and which are not in effect in an order specified by the logical directed graph, wherein a policy rule is determined to be in effect if the constraint expression included within the policy rule is deemed mutually satisfiable with respect to each constraint expression included within each in-effect policy rule, and wherein a policy rule is determined not to be in effect if the constraint expression included within the policy rule is deemed not mutually satisfiable with respect to a constraint expression included within at least one in-effect policy rule.

2. The method of claim 1, further comprising:

extracting the policy rules from one or more policy documents received from one or more policy authorities.

3. The method of claim 1, wherein constructing the logical directed graph of the policy rules based on at least priority relationships between the policy rules comprises creating a cycle between policy rules that include constraint expressions having mutable references to the same configuration state variable and that have equal priority.

4. The method of claim 1, wherein a policy rule is also determined not to be in effect if the policy rule is one of a plurality of policy rules that comprise a cycle in the logical directed graph and a constraint expression in any one of the policy rules that comprise the cycle is deemed unsatisfiable.

5. The method of claim 1, wherein constructing the logical directed graph of the policy rules comprises:

constructing the logical directed graph based also on post-conditional relationships between the policy rules, wherein a post-conditional relationship exists between each policy rule that includes a non-mutable primed reference to a given configuration state variable and every policy rule that contains a mutable reference to the given configuration state variable.

6. The method of claim 5, wherein determining which policy rules are in effect and which are not in effect in an order specified by the logical directed graph comprises:

determining if a given policy rule is in effect only after determining whether other policy rules having a post-conditional relationship with the given policy rule are in effect or not in effect.

7. The method of claim 1, wherein constructing the logical directed graph of the policy rules comprises:
constructing the logical directed graph based also on dependency relationships between the policy rules, wherein a dependency relationship exists between a first policy rule and a second policy rule if the first policy rule includes a condition indicating that the second policy rule must hold true for the first policy rule to be in effect.

8. The method of claim 7, wherein determining which policy rules are in effect and which are not in effect in an order specified by the logical directed graph comprises:
determining that a given policy rule is not in effect if the given policy rule depends, by virtue of a dependency relationship, on another policy rule that has been determined not to be in effect.

9. The method of claim 1, wherein the logical directed graph comprises a plurality of disconnected sub-graphs and wherein determining which policy rules are in effect and which are not in effect in an order specified by the logical directed graph comprises processing each disconnected sub-graph independently.

10. The method of claim 1, further comprising:
receiving one or more additional rules, wherein each additional rule includes a constraint expression that references zero or more configuration state variables associated with the target entity and wherein a reference to a configuration state variable within an additional rule may comprise a conditionally mutable reference; and
wherein constructing the logical directed graph of the policy rules comprises constructing a logical directed graph of the policy rules and the additional rule(s) based at least in part on conditional-mutability relationships between the policy rules and the additional rule(s), wherein a conditional-mutability relationship exists between a given policy rule and a given additional rule when the given policy rule includes a constraint expression having a mutable reference to a given configuration state variable and the given additional rule includes a constraint expression having a conditionally mutable reference to the given configuration state variable.

11. The method of claim 1, further comprising:
generating a report that describes one or more of the following:
which of the plurality of policy rules are in effect;
which of the plurality of policy rules are not in effect;
a basis for why one or more policy rules are not in effect;
one or more configuration state variables that were modified due to the enactment of one or more of the plurality of policy rules;
one or more new values respectively associated with one or more configuration state variables that were modified due to the enactment of one or more of the plurality of policy rules; and
an identification of policy rules that contributed to the value of a given configuration state variable.

12. A system, comprising:
a document processor configured to receive one or more policy documents applicable to a target entity and to extract a plurality of policy rules therefrom, wherein each policy rule includes a constraint expression that references zero or more configuration state variables associated with the target entity, wherein a reference to a configuration state variable may comprise a mutable or non-mutable reference, the document processor being further configured to receive a conflict resolution model;
a rule processor configured to construct a logical directed graph of the policy rules based on at least priority relationships between the policy rules, wherein priority relationships exist between policy rules that include constraint expressions having mutable references to the same configuration state variable and wherein the relative priority of the policy rules is determined in reference to the conflict resolution model; and
a graph processor configured to determine which policy rules are in effect and which are not in effect in an order specified by the logical directed graph, wherein the graph processor determines that a policy rule is in effect if the constraint expression included within the policy rule is deemed mutually satisfiable with respect to each constraint expression in each in-effect policy rule and determines that a policy rule is not in effect if the constraint expression included within the policy rule is deemed not mutually satisfiable with respect to a constraint expression included in at least one in-effect policy rule.

13. The system of claim 12, wherein the rule processor is configured to construct the logical directed graph of the policy rules based on at least priority relationships between the policy rules by creating a cycle between policy rules that include constraint expressions having mutable references to the same configuration state variable and that have equal priority.

14. The system of claim 12, wherein the graph processor is further configured to determine that a policy rule is not in effect if the policy rule is one of a plurality of policy rules that comprise a cycle in the logical directed graph and a constraint expression in any one of the policy rules that comprise the cycle is deemed unsatisfiable.

15. The system of claim 12, wherein the rule processor is configured to construct the logical directed graph based also on post-conditional relationships between the policy rules, wherein a post-conditional relationship exists between each policy rule that includes a non-mutable primed reference to a given configuration state variable and every policy rule that contains a mutable reference to the given configuration state variable.

16. The system of claim 15, wherein the graph processor is configured to determine if a given policy rule is in effect only after determining whether other policy rules having a post-conditional relationship with the given policy rule are in effect or not in effect.

17. The system of claim 12, wherein the rule processor is configured to construct the logical directed graph based also on dependency relationships between the policy rules, wherein a dependency relationship exists between a first policy rule and a second policy rule if the first policy rule includes a condition indicating that the second policy rule must hold true for the first policy rule to be in effect.

18. The system of claim 17, wherein the graph processor is further configured to determine that a given policy rule is not in effect if it depends, by virtue of a dependency relationship, on another policy rule that has been determined not to be in effect.

19. A computer program product comprising a computer-readable storage device having computer program logic recorded thereon for enabling a processing unit to manage the configuration state of a target entity, the computer program logic comprising:
first means for enabling the processing unit to receive a plurality of policy rules applicable to the target entity, wherein each policy rule includes a constraint expression that references zero or more configuration state variables associated with the target entity, wherein a reference to a configuration state variable may comprise a mutable or non-mutable reference;

second means for enabling the processing unit to receive a conflict resolution model;

third means for enabling the processing unit to construct a logical directed graph of the policy rules based on at least priority relationships between the policy rules, wherein priority relationships exist between policy rules that include constraint expressions having mutable references to the same configuration state variable and wherein the relative priority of the policy rules is determined in reference to the conflict resolution model; and fourth means for enabling the processing unit to determine which policy rules are in effect and which are not in effect in an order specified by the logical directed graph, wherein a policy rule is determined to be in effect if the constraint expression included within the policy rule is deemed mutually satisfiable with respect to each constraint expression included within each in-effect policy rule and wherein a policy rule is determined not to be in effect if the constraint expression included within the policy rule is deemed not mutually satisfiable with respect to a constraint expression included within at least one in-effect policy rule.

\* \* \* \* \*